US010002643B2

(12) United States Patent
Morisawa et al.

(10) Patent No.: US 10,002,643 B2
(45) Date of Patent: Jun. 19, 2018

(54) REPRODUCING APPARATUS, CORRELATED INFORMATION NOTIFYING METHOD, AND CORRELATED INFORMATION NOTIFYING PROGRAM

(75) Inventors: Yujin Morisawa, Kanagawa (JP); Takashi Kinouchi, Tokyo (JP); Hideo Tsukazaki, Tokyo (JP); Takeshi Ozawa, Chiba (JP)

(73) Assignee: Sony Corporation, Tokyo (JP)

( * ) Notice: Subject to any disclaimer, the term of this patent is extended or adjusted under 35 U.S.C. 154(b) by 1545 days.

(21) Appl. No.: 11/550,215

(22) Filed: Oct. 17, 2006

(65) Prior Publication Data

US 2007/0112940 A1 May 17, 2007

(30) Foreign Application Priority Data

Oct. 26, 2005 (JP) .................. 2005-311507
Sep. 1, 2006 (JP) .................. 2006-237496

(51) Int. Cl.
*G11B 27/10* (2006.01)
*G11B 27/34* (2006.01)
(Continued)

(52) U.S. Cl.
CPC ...... *G11B 27/105* (2013.01); *G06F 17/30743* (2013.01); *G06F 17/30749* (2013.01);
(Continued)

(58) Field of Classification Search
CPC ... G11B 27/105; G11B 27/34; G11B 20/0084; G06F 17/30743; G06F 17/30749; G06F 17/30775
(Continued)

(56) References Cited

U.S. PATENT DOCUMENTS 5,778,181 A * 7/1998 Hidary ................... H04L 29/06
                                                      348/E7.024
5,924,071 A * 7/1999 Morgan et al. ............... 704/278
(Continued)

FOREIGN PATENT DOCUMENTS

EP    1 494 403 A2    1/2005
EP    1 513 292 A1    3/2005
(Continued)

OTHER PUBLICATIONS

Japanese Office Action dated Aug. 2, 2011, in Patent Application No. 2006-237496.
(Continued)

*Primary Examiner* — Davetta W Goins
*Assistant Examiner* — Daniel Sellers
(74) *Attorney, Agent, or Firm* — Oblon, McClelland, Maier & Neustadt, L.L.P.

(57) ABSTRACT

A reproducing apparatus is disclosed. The reproducing apparatus includes a reproducing section, a notifying section, and a notification controlling section. The reproducing section reproduces content data. The notifying section notifies a user that there are content data correlated with content data reproduced by the reproducing section. The notification controlling section determines whether content data correlated with content data reproduced by the reproducing section have been retrieved and controls the notifying section to notify the user that there are the correlated content data when the correlated content data have been retrieved.

28 Claims, 28 Drawing Sheets

(51) Int. Cl.
*G11B 20/00* (2006.01)
*G06F 17/30* (2006.01)

(52) U.S. Cl.
CPC ........ *G06F 17/30775* (2013.01); *G11B 27/34* (2013.01); *G11B 20/0084* (2013.01)

(58) Field of Classification Search
USPC .................................. 700/94; 715/716, 727
See application file for complete search history.

(56) References Cited

U.S. PATENT DOCUMENTS

| | | | |
|---|---|---|---|
| 6,105,021 A * | 8/2000 | Berstis | |
| 6,201,176 B1 | 3/2001 | Yourlo | |
| 6,209,011 B1 | 3/2001 | Vong et al. | |
| 6,539,395 B1 | 3/2003 | Gjerdingen et al. | |
| 6,937,732 B2 * | 8/2005 | Ohmura et al. | 381/86 |
| 7,003,515 B1 | 2/2006 | Glaser et al. | |
| 7,966,334 B1 * | 6/2011 | Bezos et al. | 707/748 |
| 8,260,656 B1 * | 9/2012 | Harbick | G06Q 30/02 705/26.7 |
| 2002/0156864 A1 | 10/2002 | Kniest | |
| 2003/0112467 A1 | 6/2003 | McCollum et al. | |
| 2003/0135513 A1 * | 7/2003 | Quinn et al. | 707/102 |
| 2003/0191753 A1 | 10/2003 | Hoch | |
| 2003/0195803 A1 * | 10/2003 | Ketonen | G06Q 10/10 705/14.39 |
| 2003/0236582 A1 * | 12/2003 | Zamir et al. | 700/94 |
| 2004/0193649 A1 * | 9/2004 | Doshida et al. | 707/104.1 |
| 2004/0266443 A1 | 12/2004 | Ito | |
| 2005/0020207 A1 | 1/2005 | Hamada et al. | |
| 2005/0020223 A1 * | 1/2005 | Ellis | H04B 1/20 455/186.1 |
| 2005/0108297 A1 * | 5/2005 | Rollin | G06F 17/30174 |
| 2006/0195789 A1 * | 8/2006 | Rogers et al. | 715/727 |
| 2006/0212442 A1 * | 9/2006 | Conrad et al. | 707/5 |
| 2006/0212478 A1 * | 9/2006 | Plastina et al. | 707/104.1 |
| 2006/0272479 A1 | 12/2006 | Takatsuka et al. | |
| 2007/0008830 A1 | 1/2007 | Tsukazaki et al. | |
| 2007/0053246 A1 | 3/2007 | Sano et al. | |
| 2007/0085840 A1 | 4/2007 | Asaka et al. | |
| 2007/0111739 A1 | 5/2007 | Hamada et al. | |
| 2007/0136750 A1 * | 6/2007 | Abanami et al. | 725/44 |
| 2008/0021851 A1 * | 1/2008 | Alcalde et al. | 706/21 |

FOREIGN PATENT DOCUMENTS

| | | |
|---|---|---|
| EP | 1 742 222 A1 | 1/2007 |
| EP | 1 783 593 A2 | 5/2007 |
| JP | 2001-51777 | 2/2001 |
| JP | 2003-50816 | 2/2003 |
| JP | 2003-203088 | 7/2003 |
| JP | 2003-259310 | 9/2003 |
| JP | 2004-125825 | 4/2004 |
| JP | 2004-264895 | 9/2004 |
| JP | 2004-357184 | 12/2004 |
| JP | 2005-11457 | 1/2005 |
| JP | 2005-165617 | 6/2005 |
| JP | 2006-344342 | 12/2006 |
| WO | WO 0217099 A1 * | 2/2002 |
| WO | WO 2006/121200 A1 | 11/2006 |
| WO | WO 2007/029436 A1 | 3/2007 |

OTHER PUBLICATIONS

Office Action dated Apr. 6, 2011 in European Patent Application No. 06 123 030.6-1247.
Extended European Search Report dated Mar. 29, 2011, in Application No. / Patent No. 09173834.4-1247 / 2144241.
Office Action dated May 29, 2012 in Japanese Application No. 2006-237496.
European Office Action dated Nov. 10, 2015 in Patent Application 09173834.4.
Extended European Search Report dated Sep. 21, 2016 in European Application No. 16178174.5.

* cited by examiner

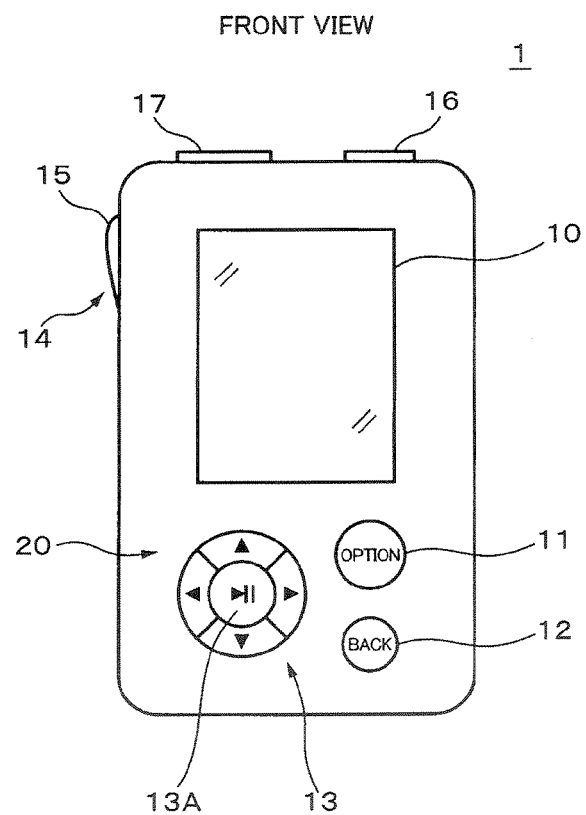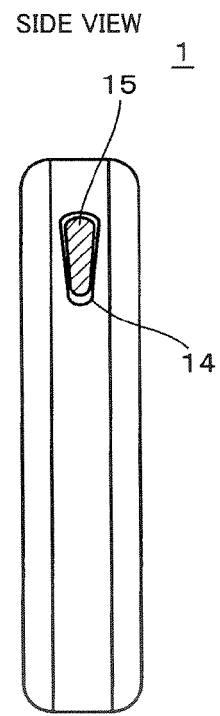
*Fig. 2A* FRONT VIEW
*Fig. 2B* SIDE VIEW

Fig. 5

| CONTENT ID | ALBUM ID | ARTIST ID | GENRE ID | RELEASE INFORMATION | REPRODUCTION FREQUENCY | RATING | RANKING INFORMATION | SALES INFORMATION | REGISTERED DATE |
|---|---|---|---|---|---|---|---|---|---|
| C_1 | Al_1 | Ar_1 | G_1 | 2004/12/1 | PT_1 | Rt_1 | R_1 | S_1 | 2005/6/1 |
| C_2 | Al_1 | Ar_1 | G_1 | 2004/12/1 | PT_2 | Rt_2 | R_2 | S_1 | 2005/6/1 |
| C_3 | Al_2 | Ar_1 | G_1 | 1995/4/5 | PT_3 | Rt_3 | R_3 | S_2 | 2005/3/1 |
| C_4 | Al_3 | Ar_2 | G_2 | 1969/2/1 | PT_4 | Rt_4 | R_4 | S_3 | 2005/7/1 |
| C_5 | Al_3 | Ar_2 | G_2 | 1969/2/1 | PT_5 | Rt_5 | R_5 | S_3 | 2005/7/1 |

CURSOR MOVES

REPRODUCING APPARATUS, CORRELATED INFORMATION NOTIFYING METHOD, AND CORRELATED INFORMATION NOTIFYING PROGRAM

CROSS REFERENCES TO RELATED APPLICATIONS

The present invention contains subject matter related to Japanese Patent Application No. 2005-311507 filed on Oct. 26, 2005, and Japanese Patent Application No. 2006-237496 filed on Sep. 1, 2006, the entire contents of which being incorporated herein by reference.

BACKGROUND OF THE INVENTION

Field of the Invention

The present invention relates to a reproducing apparatus, a correlated information notifying method, and a correlated information notifying program that notify a user that there is content correlated with content that is being reproduced.

Description of the Related Art

In recent years, many portable reproducing apparatuses using a small hard disk drive as a record medium have been commercially produced (hereinafter these apparatuses are referred to as portable devices (PDs)). The recording capacities of small hard disk drives range from several gigabytes (GB) to around several ten GB, which allow a large number of tracks such as several hundred tracks to several thousand tracks to be recorded. Thus, PDs have been drastically widespread. Since the housing of a PD is small and light, content made up of audio data such as music can be recorded as tracks on a record medium of the PD. The user can use the PD outdoor and enjoy listening music reproduced from the record medium.

Content reproduced by such a PD is transferred from an information device such as a personal computer connected through a predetermined communication interface and recorded on the record medium of the PD. On the other hand, the personal computer side rips content from a commercial music compact disc (CD) and records the content in a hard disk drive (HDD). Instead, the personal computer side downloads content from a server on the Internet and records the content in a HDD. Content recorded in the HDD of the personal computer is transferred to the PD and recorded on the record medium of the PD.

When a large number of tracks of music are recorded on the record medium and used, it is necessary for an interface that selects and designates a track of music recorded on the record medium to quickly select a desired track. Such an interface uses for example a rotating wheel or multi-direction keys that designate up and down directions or up, down, left, and right directions to move a cursor on a track list displayed on a display section and select a desired track. When a reproduction key is pressed, a track at the position of the cursor is reproduced.

On the other hand, a PD is often used while the user is moving (for example, walking). Thus, it may be difficult for the user to select his or her desired track with reference to text information. In this case, the user will select his or her desired track by successively reproducing tracks recorded on the record medium. This operation is very cumbersome. To solve this problem, a technology of successively reproducing a highlight portion of each track of an album is disclosed for example as Japanese Patent Application Laid-Open No. 2003-50816. According to the method of this related art reference, since the user can automatically check the contents of each track of an album, he or she can easily select his or her desired music without necessity of using his or her hand.

SUMMARY OF THE INVENTION

While the PD is reproducing particular content, the user is likely to cause the PD to reproduce other content correlated with the particular content. Instead, the user is likely to cause the PD to successively reproduce content he or she likes regardless of particular albums and artists.

In the related art reference, the user causes the PD to display content retrieval list screens such as an artist list, an album list, and a track list on a display section of the PD. The user manually retrieves his or her desired content on the list screens with the rotating wheel or multi-direction keys and causes the PD to reproduce the desired content. Thus, it is very cumbersome.

Even if the method of the related art reference is used, each track that is successively and automatically reproduced is only for an album. In other words, user's favorite content is not automatically reproduced.

In view of the foregoing, it would be desirable to provide a reproducing apparatus, a correlated information notifying method, and a correlated information notifying program that allow content correlated with content that is being reproduced to be easily retrieved and the retrieved content to be reproduced.

According to an embodiment of the present invention, there is provided a reproducing apparatus including a reproducing section, a notifying section, and a notification controlling section. The reproducing section reproduces content data. The notifying section notifies a user that there are content data correlated with content data reproduced by the reproducing section. The notification controlling section determines whether content data correlated with content data reproduced by the reproducing section have been retrieved and controls the notifying section to notify the user that there are the correlated content data when the correlated content data have been retrieved.

According to an embodiment of the present invention, there is provided a correlated information notifying method. Content data are reproduced. It is determined whether there are content data correlated with the reproduced content data. A user is notified that there are content data when it has been determined that there are the correlated content data.

According to an embodiment of the present invention, there is provided a correlated information notifying program which causes a computer to execute a correlated information notifying method. Content data are reproduced. It is determined whether there are content data correlated with the reproduced content data. A user is notified that there are content data when it has been determined that there are the correlated content data.

According to embodiments of the present invention, it is determined whether correlated content data correlated with content data that are being reproduced have been recorded in a recoding section that accumulatively records content data. When it has been determined that the correlated content data have been recorded, the user is notified that the correlated content data have been recorded. Thus, the user can know that there are the correlated content data correlated with content data that are being reproduced without necessity of performing a retrieval operation for content data.

These and other objects, features and advantages of the present invention will become more apparent in light of the following detailed description of best mode embodiments thereof, as illustrated in the accompanying drawings.

BRIEF DESCRIPTION OF THE DRAWINGS

FIG. 2A and FIG. 2B are a front view and a side view, respectively, showing an example of a portable reproducing apparatus according to an embodiment of the present invention;

FIG. 5 is a schematic diagram showing an example of the structure of an attribute information table;

DETAILED DESCRIPTION OF THE PREFERRED EMBODIMENTS

Figure 1:
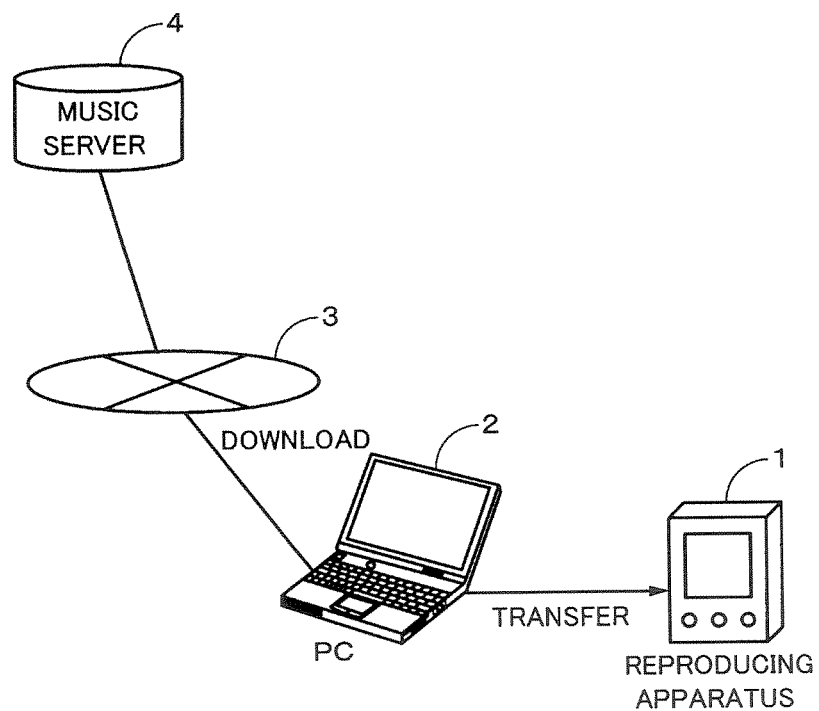
FIG. 1 is a schematic diagram showing an example of a configuration of which a reproducing apparatus according to an embodiment of the present invention is used.

Next, embodiments of the present invention will be described in the following order.
1. System applicable to embodiment of present invention
1-1. Configuration of system according to embodiment of present invention
1-2. Structure of reproducing apparatus
1-3. Outlined operation of preview reproduction
1-4. Outlined operation of artist link mode
2. More specific operation in artist link mode and GUI
3. Correlated information notifying method according to first embodiment of present invention
4. Correlated information notifying method according to second embodiment of present invention
4-1. Example of which second embodiment is applied to subscription service
5. Modification of second embodiment of present invention
6. Operations after notification of correlated content in common with second embodiment and its modification
7. Example of retrieval for correlated content according to attribute other than artist
8. Modification other than first embodiment, second embodiment, and modification of second embodiment
9. Correlated information notifying method according to third embodiment of present invention 1. System Applicable to Embodiment of Present Invention 1-1. Configuration of System According to Embodiment of Present Invention FIG. 1 shows an example of a configuration of which a reproducing apparatus 1 according to an embodiment of the present invention is used. The reproducing apparatus 1 is a portable device (PD) having a small and light housing. The reproducing apparatus 1 has a hard disk drive as a record medium. The reproducing apparatus 1 reproduces content from the record medium. The reproducing apparatus 1 has an interface communicable with a personal computer 2 (hereinafter abbreviated as the PC 2). Examples of the interface include a Universal Serial Bus (USB) interface and an Institute of Electrical and Electronics Engineers 1394 (IEEE 1394) interface. In this example, the reproducing apparatus 1 and the PC 2 are connected through a USB cable as a communication interface.

In the following description, it is assumed that content data recorded on the record medium of the reproducing apparatus 1 is music data, namely audio data. One unit of music data is also referred to as a track.

A music server 4 provides services such as a content data download service through the Internet 3. The music server 4 manages content data by correlating them with attribute information such as artists, albums, and music genres. It is preferred that attribute information correlated with content data be melodies and tempos of music. In addition, the music server 4 manages ranking information with the number of times content data have been downloaded and correlated information among artists (this information is referred to as artist link information). The music server 4 provides services using these information through the Internet 3. For example, these ranking information, artist link information, and so forth are added to the foregoing attribute information that is provided to the user. Release dates of albums and content data may be added to the attribute information.

The user connects for example the PC 2 to the Internet 3 and downloads content data from the music server 4 on the Internet 3 to the PC 2. The downloaded content data are stored, for example, in the hard disk drive of the PC 2. In addition, the user connects the reproducing apparatus 1 and the PC 2 with the USB cable so as to transfer content data recorded in the hard disk drive of the PC 2 to the reproducing apparatus 1. The reproducing apparatus 1 records the transferred content data to the internal record medium. When the user disconnects the reproducing apparatus 1 from the PC 2, he or she can use the reproducing apparatus 1 outdoor to reproduce content data from the record medium of the reproducing apparatus 1.

When the user downloads content data from the music server 4, if he or she additionally obtains ranking information as attribute information, he or she can easily retrieve currently popular content. If the user additionally obtains artist link information as attribute information, he or she can easily know an artist correlated with the artist of the selected content and easily retrieve content of the correlated artist. If the reproducing apparatus 1 stores a history of reproduced content data, he or she can easily retrieve his or her favorite content.

1-2. Structure of Reproducing Apparatus

FIG. 2 shows an appearance of an example of the portable reproducing apparatus 1 according to an embodiment of the present invention. FIG. 2A and FIG. 2B show a front view and a side view of the reproducing apparatus 1, respectively. As exemplified in FIG. 2A, the front surface of the reproducing apparatus 1 has a display section 10 and an operation section 20. The display section 10 uses for example an organic Electro Luminescence (EL) as a display device that displays information for the user. The operation section 20 has a plurality of keys with which a user's operation is accepted. The display section 10 can perform a display control to an accuracy for example of one dot to display text, simple characters, icons, and so forth.

Disposed on the upper surface of the reproducing apparatus 1 are a hold switch 16 and a connector section 17. The hold switch 16 selects an enable state or a disable state of the operation section 20. The connector section 17 is provided with a connector that exchanges digital data with an external device, for example, the PC 2, and a headset terminal that outputs an analog audio signal reproduced by the reproducing apparatus 1.

As exemplified in FIG. 2B, a discovery button 14 is disposed on one side surface of the reproducing apparatus 1 in such a manner that the discovery button 14 can be pressed therefrom. When the user holds the reproducing apparatus 1 with his or her left hand in the state that he or she can see the display section 10, he or she can press the discovery button 14 with his or her left thumb. The nearly most of the discovery button 14 is made up of a lighting section 15. The lighting section 15 contains for example a light emitting diode (LED). Illumination of the light emission device can be seen from the outside through the lighting section 15.

As exemplified in FIG. 2A, the discovery button 14 is disposed so that when the user faces the front surface of the reproducing apparatus 1, he or she can see the lighting section 15.

Next, keys disposed on the operating section 20 will be described. When each key is, for example, pressed, a control signal corresponding to the key is output. In addition, different functions may be assigned to each key depending on whether it is pressed for a long time period or a short time period. In other words, different functions may be assigned to each key depending on whether the time period for which key is pressed is equal to or longer than a predetermined value (this state is referred to as the longly pressed state) or shorter than the predetermined value (this state is referred to as the shortly pressed state). When each key is shortly pressed, the assigned function is executed after the key is pressed and released in a predetermined time period. On the other hand, when a key is longly pressed, after it is pressed for a predetermined time period or longer, the assigned function is executed. If a key has been assigned only the shortly pressed state, when the key is pressed, the assigned function is executed. If a key is pressed for a predetermined time period or longer, this state can be defined as if the key were repeatedly pressed (this state is referred to as the key repeat state).

A key 11 is a key with which an optional function is selected. When a key 12 is shortly pressed, an operation for the reproducing apparatus 1 can be traced back. When the key 12 is longly pressed, a top menu is displayed on the display section 10.

A key block 13 has five direction keys that are an enter key 13A disposed at the center and arrow keys disposed around the enter key 13A. The arrow keys indicate up, down, left, and right (they are referred to as an up key, a down key, a left key, and a right key). The functions of the key block 13 are assigned depending on the state of the reproducing apparatus 1.

While the display section 10 displays a screen on which content is currently being reproduced, when the enter key 13A is shortly pressed, the currently reproduced content is commanded to be alternately reproduced and paused. While the display section 10 displays a screen other than the content reproduction screen, when the enter key 13A is pressed, an item selected on the screen is confirmed. While the display section 10 displays a list of content items, when the enter key 13A is pressed, all content on the list is commanded to be reproduced.

When the up key and the down key of the key block 13 are shortly pressed, the currently selected item on the display section 10 is switched to the immediately upper item and the immediately lower item, respectively. When the up key and the down key are longly pressed, the list on the display section 10 is commanded to be quickly scrolled upward and downward, respectively. The key repeat function operates with the up key and the down key until they are longly pressed. Thus, with the up key and down key, the screen can be scrolled upward and downward, respectively.

When the left key and right key of the key block 13 are shortly pressed, the currently selected item is switched to the immediately left item and the immediately right item, respectively. When the display section 10 displays a plurality of pages, the left key and the right key cause the current page to be switched, for example, to the next page and the preceding page, respectively. The left key and the right key do not have the longly pressed state. However, the key repeat function operates with the left key and the right key.

When the discovery button 14 is shortly pressed, an artist link function using artist link information is commanded to be called. When the discovery button 14 is longly pressed, the artist link function is called, causing content of all artists displayed on the display section 10 to be reproduced. Details of the artist link function will be described later.

The functions of the key 11, the key 12, and the key block 13 are just examples. The functions of these keys and key block are not limited to these examples. Operation functions can be assigned as software to the key 11, the key 12, and the key block 13.

Figure 3:
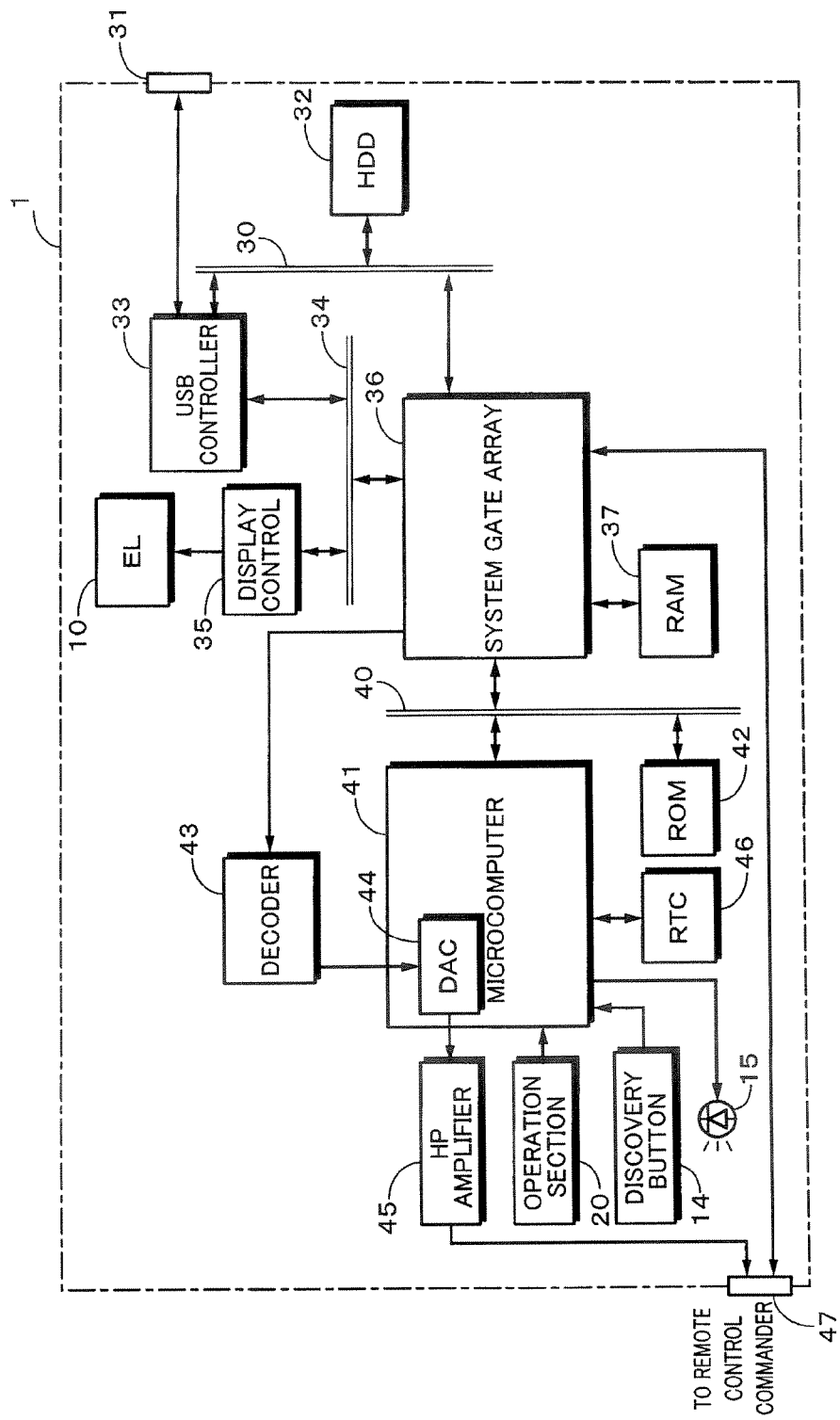
FIG. 3 is a block diagram showing an example of the structure of the reproducing apparatus.

FIG. 3 shows an example of the structure of the reproducing apparatus 1. In the example shown in FIG. 3, the reproducing apparatus 1 has three buses 30, 34, and 40. Connected to the bus 30 are a hard disk drive (HDD) 32, a Universal Serial Bus (USB) controller 33, and a system gate array 36. The bus 30 mainly transfers content data. Connected to the USB controller 33 is a USB connector 31. The USB controller 33 controls communications with an external device connected to the USB connector 31.

Connected to the bus 34 are the USE controller 33, a display controlling section 35, and the system gate array 36. The bus 34 mainly transfers commands. The display controlling section 35 drives the display section 10, composed of for example an EL, with a display control signal supplied through the bus 34. The display controlling section 35 causes the display section 10 to display a screen corresponding to the display control signal. The display device that can be used for the display section 10 may be for example a Liquid Crystal Display (LCD) instead of the EL.

Connected to the bus 40 are a microcomputer 41, the system gate array 36, and a Read Only Memory (ROM) 42. The bus 40 mainly transfers commands. Connected to the microcomputer 41 are a Real Time Clock (RTC) 46 and the operating section 20. The operating section 20 generates control signals corresponding to the keys 11 to 13 and supplies the generated control signals to the microcomputer 41. The microcomputer 41 controls the entire reproducing apparatus 1 with control signals supplied from the operating section 20 according to a program pre-stored, for example, in the ROM 42. In addition, the microcomputer 41 generates predetermined display control signals according to the program.

The microcomputer 41 has an internal D/A converter (DAC) section 44. The DAC section 44 converts audio data supplied from a decoder (which will be described later) into an analog audio signal and supplies the analog audio signal to a headset (headphone) (HP) amplifier 45.

An output signal of the discovery button 14 is supplied to the microcomputer 41. The microcomputer 41 can determine whether the discovery button 14 has been pressed according to the output signal of the discovery button 14. In addition, the microcomputer 41 can control illumination of the lighting section 15, which is an LED.

The ROM 42 is for example an Electrically Erasable Programmable Read Only Memory (EEPROM), which is a rewritable memory. The ROM 42 can update its stored program. A program to be updated in the ROM 42 is supplied, for example, from an external computer device through the USB connector 31.

Since the microcomputer 41 controls the reproducing apparatus 1 according to the program stored in the ROM 42, it can be considered that the reproducing apparatus 1 is substantially a computer device.

The system gate array 36 controls exchanging data and commands among the buses 30, 34, and 40. Connected to the system gate array 36 are a RAM 37 and a decoder 43. The decoder 43 decodes audio data that have been compression-encoded. The RAM 37 is used as a work memory of the microcomputer 41. In addition, the RAM 37 is used as a buffer for audio data that the decoder 43 decodes. The RAM 37 has a storage capacity of for example 16 Mega Bytes (MB). Among 16 MB, a predetermined area of 12 MB is allocated as a buffer memory area for audio data.

Connected to a remote control terminal 47 is a remote control commander that wirelessly and remotely controls the reproducing apparatus 1 and has a headset terminal. An analog audio signal that is output from the headset amplifier 45 is supplied to the remote control terminal 47. In addition, the system gate array 36 and the remote control terminal 47 are connected. A control signal corresponding to an operation for the remote control commander is input from the remote control terminal 47 and supplied to the microcomputer 41 through the system gate array 36 and the bus 40.

The foregoing USB connector 31 and remote control terminal 47 are disposed in the connector section 17 as exemplified in FIG. 2. The hold switch 16 is connected to the microcomputer 41 (not shown).

In the foregoing description, the reproducing apparatus 1 and the PC 2 are wire-connected. However, this structure is just an example. Instead, a wireless communication I/F (not shown) that controls wireless communications may be connected to the bus 30. The wireless communication I/F may allow the reproducing apparatus 1 and the PC 2 to wirelessly exchange commands therebetween and the PC 2 to wirelessly transfer content data to the reproducing apparatus 1.

Figure 4:
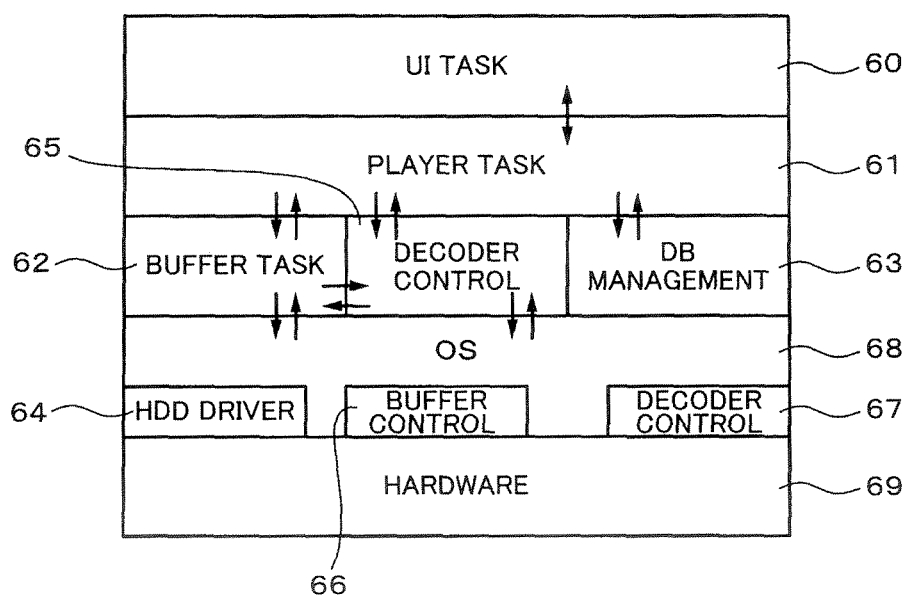
FIG. 4 is a schematic diagram showing an architecture applicable to the reproducing apparatus.

FIG. 4 schematically shows an architecture applicable to the reproducing apparatus 1. A User Interface (UI) task 60 accomplishes a user interface that causes the display section 10 to display data and generates control signals corresponding to operations of the operating section 20. The UI task 60 for example controls a cursor indication 70 corresponding to operations of the key block 13 of the operating section 20 and generates reproduction control commands for audio data. Examples of the reproduction control commands include play (reproduction), stop (reproduction stop), feed forward (fast forward with reproduction), rewind (rewind with reproduction), cue (fast forward without reproduction), review (rewind without reproduction), and pause (reproduction pause).

A player task 61 is placed below the UI task 60. The player task 61 manages reproduction of content data. The player task 61 exchanges data with a database (that will be described later) corresponding to a command received from the UI task 60, obtains content to be reproduced, and issues a content data reproduction control command to lower tasks. In addition, the player task 61 regularly obtains the current play mode, returns the play mode to the UI task 60, and controls reproduction corresponding to a play mode.

A play mode is an operation mode with respect to reproduction order of content items. There are some play modes that are for example a normal mode of which content items are reproduced in the order of a list and a shuffle mode of which content items are randomly reproduced.

A buffer task 62, a database (DB) management task 63, and a decoder control task 65 are placed below the player task 61. The buffer task 62 controls reading and writing of data from and to the buffer memory area of the RAM 37. In addition, the buffer task 62 controls reading of audio data from the hard disk drive 32. In addition, the buffer task 62 analyzes header information of audio data stored in the buffer memory. The buffer task 62 controls the buffer memory as a ring buffer of which its top address and its last address are logically connected.

The database management task 63 manages content data recorded in the hard disk drive 32. The database management task 63 correlatively manages for example identification information (ID) with which content data recorded in the hard disk drive 32 are identified, information representing record positions of the content data, and attribute information of the content data. In addition, the database management task 63 manages artist link information. Details of the database managed by the database management task 63 will be described later.

The decoder control task 65 controls a decoding process that the decoder 43 performs for audio data. The control of the decoder control task 65 is interlocked with the process of for example the buffer task 62.

An operating system (OS) 68 integrally manages the UI task 60, the player task 61, the buffer task 62, the decoder control task 65, and the database management task 63, which are upper tasks of the OS 68. In addition, the OS 68 provides fundamental functions of software to each task. For example, the OS 68 provides a file system that manages files recorded in the hard disk drive 32 to each upper task. The file system manages each logical address of the record area of the hard disk drive 32 and files in the hard disk drive 32. The file system provides a scheme for reading and writing of data from and to the hard disk drive 32.

In addition, the OS 68 manages each component of hardware that composes the reproducing apparatus 1. The OS 68 performs an intermediate process between the upper tasks and hardware 69 of the reproducing apparatus 1. The OS 68 has for example an HDD driver 64 that controls the hard disk drive 32, a buffer controlling section 66 that controls reading and writing of data from and to the buffer memory area of the RAM 37, and a decoder controlling section 67 that controls the decoder 43.

The OS 68 and the tasks 60 to 65 shown in FIG. 4 are accomplished by the microcomputer 41 according to a program stored or recorded in the ROM 42 and/or the hard disk drive 32.

In such a structure, when the reproducing apparatus 1 and the PC 2 are connected with the USB cable, the USB controller 33 exchanges data with the PC 2 in a predetermined manner so that the PC 2 recognizes the reproducing apparatus 1 as a removable hard disk drive. In other words, the PC 2 can record content data recorded in the hard disk drive of the PC 2 to the hard disk drive of the reproducing apparatus 1 using a file copy function that the OS of the PC 2 provides.

The PC 2 transmits content data and commands to the reproducing apparatus 1 through the USB cable. The content data and commands are received by the USB controller 33. The received content data are transferred by the USB controller 33 to the hard disk drive 32 through the bus 30 and written to the hard disk drive 32. In addition, the received commands are received from the USB controller 33 to the microcomputer 41 through the system gate array 36.

Next, a process for reproduction will be described. For example, the microcomputer 41 references a database for content recorded in the hard disk drive 32 and generates a display control signal with which a list of content is displayed. The display control signal is supplied to the display controlling section 35 through the system gate array 36 and the bus 34. The display controlling section 35 converts the display control signal into a drive signal with which the display section 10 is driven. The drive signal is supplied to the display section 10. The display section 10 displays a list of content data which can be reproduced corresponding to the display control signal.

The user operates the operating section 20 according to for example data displayed on the display section 10 in a predetermined manner and selects content data to be reproduced. The operating section 20 outputs a control signal corresponding to the user's operation. The microcomputer 41 monitors the control signal that is output from the operating section 20. When the microcomputer 41 has obtained a control signal representing a reproduction command, the microcomputer 41 issues a command causing the selected content data to be reproduced. This command is transmitted to the hard disk drive 32 through the system gate array 36 and the bus 30.

Content data that have been read from the hard disk drive 32 are supplied to the system gate array 36 through the bus 30. The system gate array 36 stores the supplied content data in the buffer memory area of the RAM 37. In addition, the system gate array 36 reads content data for a predetermined amount at a time from the buffer memory area of the RAM 37 and transfers the content data to the decoder 43. The microcomputer 41 monitors the amount of content data stored in the buffer memory area. When the amount of data stored in the buffer memory area becomes a predetermined amount or less, the microcomputer 41 issues a content data read command to the hard disk drive 32 through the system gate array 36 and the bus 30.

The decoder 43 decodes the transferred content data and transfers them as baseband audio data to the microcomputer 41. When necessary, the microcomputer 41 performs a predetermined acoustic process for the audio data transferred from the decoder 43. The DAC section 44 converts the resultant digital audio data into analog audio data and outputs the analog audio data as an analog audio signal. The analog audio signal is supplied to the HP amplifier 45. The HP amplifier 45 performs an amplifying process for the analog audio signal and supplies the amplified analog audio signal to the remote control terminal 47.

Next, the database with which content data recorded in the hard disk drive 32 are managed will be described. This database is managed by the foregoing database management task 63. FIG. 5 shows an example of the structure of an attribute information table of the database. With the attribute information table, attribute information of content data is managed.

In the example shown in FIG. 5, each record of the attribute information table has a field "content ID", a field "album ID", a field "artist ID", a field "genre ID", a field "release information", a field "reproduction frequency", a field "rating", a field "ranking information", a field "sales information", and a field "registered date".

The field "content ID" contains an identifier unique to each content item. The field "artist ID" contains an identifier of an artist who for example performs content of the relevant content ID. The field "genre ID" contains an identifier of a music genre to which content of the relevant content ID belongs.

In FIG. 5, although a genre is identified only by the field "genre ID". However, a genre may be categorized in a plurality of levels. For example, a genre may be coarsely sub-categorized as large genres such as "rock", "jazz", "classic", and "pop" and a unique ID is assigned to each large genre. Each large genre may be also sub-categorized as small genres and a unique ID is assigned to each small genre. In combination with a large genre ID and a small genre ID, a genre ID is composed. For example, a large genre "rock"

is categorized as small genres "American", "metal", "alternative", "progressive", and so forth. As another categorizing method, a large genre "classic" is sub-categorized as small genres "baroque", "symphony", "concerto", "opera", "sonata", and so forth. In addition, a small category may be sub-categorized. Instead, without large genres, genres can be identified only by small genres.

The field "release information" contains the released date of content of the relevant content ID as year, month, and day. Generally, year, month, and day of the field "release information" are the same as those of the release date of an album that contains content identified by the relevant content ID.

The field "reproduction frequency" contains a value incremented by "1" whenever content of the relevant record is reproduced. It may be thought that the value of the field "reproduction frequency" is normalized by the number of days after content of the relevant record was recorded to the reproducing apparatus 1.

The field "rating" represents the favorite rate of the user for content of the relevant record. For example, a log file of reproduction history of content in the reproducing apparatus 1 is analyzed. The favorite rate of the user for content is obtained according to the analyzed result. For example, the number of times each content item has been reproduced or the number of times it has been skipped are obtained according to the reproduction history. With the obtained values, the favorite rate is calculated. Skipping means the state of which content is not fully reproduced, but its reproduction is stopped in the middle. The favorite rate may be obtained for example depending on whether content was fully reproduced and if it's reproduction was skipped how many percent of content was reproduced.

The favorite rate may be calculated by the reproducing apparatus 1. Instead, when the reproducing apparatus 1 is connected to the PC 2, the log file may be transferred from the reproducing apparatus 1 to the PC 2 so that it calculates the favorite rate. The favorite rate calculated by the PC 2 is transferred to the reproducing apparatus 1 and written to the database of the reproducing apparatus 1.

The field "ranking information" contains information of which responses of many general users to content were counted in a predetermined manner. For example, as ranking information, information about sales of content may be used. Instead, the number of requests for content in a radio station or the like or the number of times of pre-buying listening for content in a web site or the like may be used as ranking information. Instead, information about ranking of content counted in a predetermined manner (for example, "this week's top 10") may be used as ranking information.

The field "sales information" contains sales information of the album identified by the field "album ID" of the relevant record.

The field "registered date" contains the date on which information of the relevant record was registered and the date on which the information was updated.

In the example shown in FIG. 5, pointer information according to real data is stored as an ID in each field of each record. For example, each field of each record contains pointer information to a record of another table which contains real data. As a result, a relational database is structured. A content ID is unique to each content item data. Each record of the attribute information table is correlated with each item of real content data using a content ID. The structure of the database is not limited to this example. Instead, real data may be contained in each field other than the field "content ID".

The field "ranking information" and the field "sales information" are updated at predetermined timing. For example, when new content data are downloaded from the music server 4 to the PC 2, ranking information about each content item data stored in the PC 2 and sales information corresponding to album IDs are also downloaded. When content data are transferred from the PC 2 to the reproducing apparatus 1, the ranking information and the sales information are also transferred to the reproducing apparatus 1 and the database thereof is updated therewith.

The ranking information and the sales information may be obtained in other than the foregoing manner. For example, it may be thought that the ranking information and the sales information are periodically transmitted. When the PC 2 receives the ranking information and the sales information from the music server 4, the PC 2 temporarily stores them in the internal hard disk drive or the like. When the reproducing apparatus 1 and the PC 2 are connected, the ranking information and the sales information stored in the PC 2 are transferred to the reproducing apparatus 1.

The database management task 63 also manages the artist link information. The artist link information is what for example artist A is correlated with information of artist B, artist C, and so forth who are correlated with artist A. For example, if artist A created album Z in collaboration with artist B and artist C, it can be said that artist B and artist C are correlated artists of artist A. In addition, artist A may be correlated with other artists with respect to a style of artist A. For example, artist A may be correlated with other artists with respect to melody and tempo of main content of artist A. In addition, artist A may be correlated with other artists with respect to years in which artist A actively worked. In addition, information of artists may be correlated with respect to a plurality of kinds of information of artists and their content.

Artist link information may be assigned in different levels according to correlation rates of objective artists. For example, artist A may be correlated with first artist link information composed of information of for example artists B, C, D, and so forth who are strongly correlated with artist A and second artist link information composed of information of artists O, P, Q, and so forth who are weakly correlated with artist A.

Figure 6:
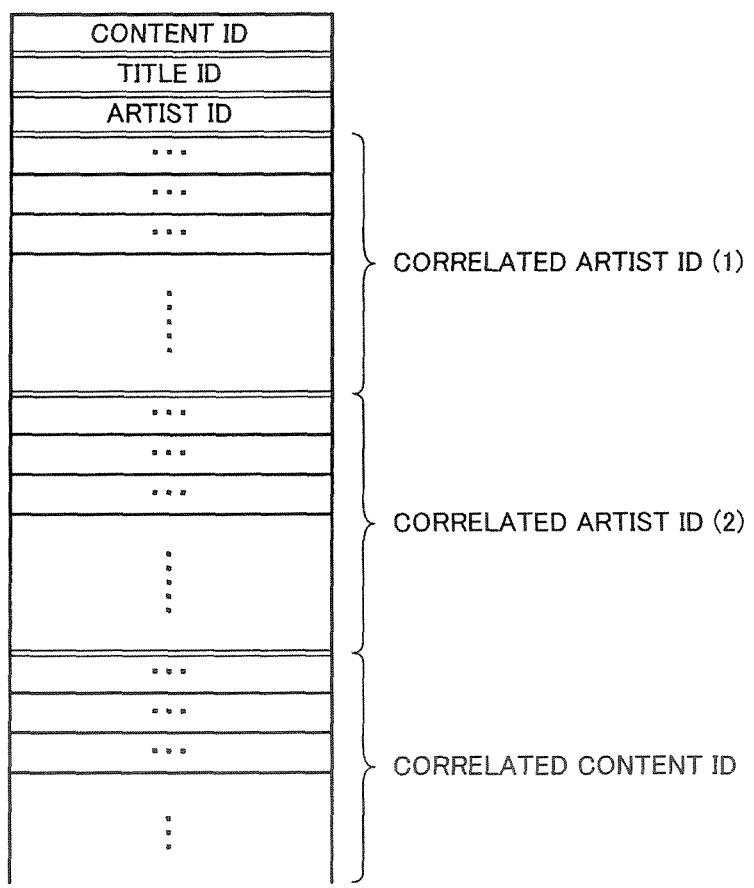
FIG. 6 is a schematic diagram showing an example of the structure of artist link information.

As exemplified in FIG. 6, the artist link information can be appended to the foregoing attribute information table. In FIG. 6, the field "album ID", the field "genre ID", the field "reproduction frequency", and the field "ranking information" are omitted from the attribute information table shown in FIG. 5. As shown in FIG. 6, a particular artist ID is correlated with a correlated artist ID (1) that is an artist ID of an artist strongly correlated with the particular artist and a correlated artist ID (2) that is an artist ID of an artist weakly correlated with the particular artist ID.

When the attribute information table is created in such a manner, an artist strongly correlated with and an artist weakly correlated with an artist corresponding to a particular content ID can be easily obtained.

In the attribute information table, besides artist information of an artist corresponding to an content ID, as exemplified in FIG. 6, a content ID of another item of content can be correlated. Thus, content correlated with content corresponding to a particular content ID can be easily obtained.

The structure of the artist link information is not limited to the foregoing example. Instead, for artist information managed by the database management task 63, these two types of tables are created. Instead, it may be thought that all fields of artist information managed by the database management task 63 are arranged in a matrix form and a correlation rate is assigned to each of the fields.

The artist link information is provided as a service of for example the music server 4 side to the user. The artist link information is downloaded from the music server 4 to the PC 2 through the Internet 3. The artist link information is transferred from the PC 2 to the reproducing apparatus 1 and then recorded to the hard disk drive 32. For example, a list of content recorded in the hard disk drive of the PC 2 and the hard disk drive 32 of the reproducing apparatus 1 is transmitted from the PC 2 to the music server 4. The music server 4 references attribute information corresponding to the list of content, creates artist link information, and transmits it to the PC 2. Instead, the user side may create artist link information.

1-3. Outlined Operation of Preview Reproduction

According to this embodiment of the present invention, if the cursor indication has been placed at a position of particular content for a predetermined time period, the particular content is selected and a predetermined portion thereof is automatically reproduced. In the following description, an operation of which only a predetermined portion of content is selectively reproduced is referred to as the preview reproduction. On the other hand, an operation of which the entire content is reproduced is referred to as the normal reproduction. A method of performing the preview reproduction will be described later.

Figure 7:
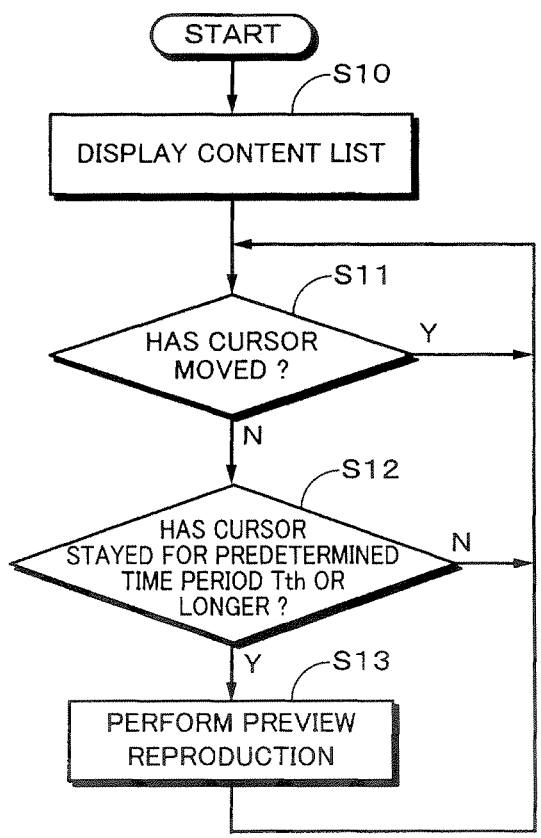
FIG. 7 is a flow chart showing an example of a process of automatically starting a preview reproduction.
Figure 8A:
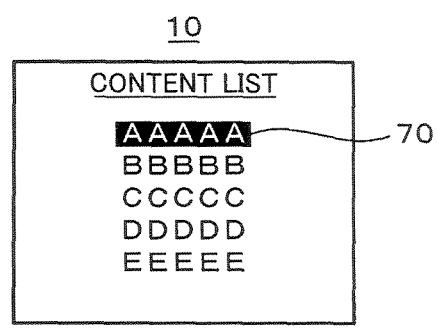
FIG. 8A, FIG. 8B, FIG. 8C, and FIG. 8D are schematic diagrams showing examples of indications displayed on a display section according to the flow chart.

FIG. 7 is a flow chart showing a process of automatically performing the preview reproduction. FIG. 8A to FIG. 8D show examples of indications that are displayed on the display section 10 according to the flow chart shown in FIG. 7. A content list is displayed on the display section 10 (at step S10). For example, as shown in FIG. 8A, a list of content names is displayed on the display section 10. In addition, the cursor indication 70 is displayed at its home position.

The cursor indication 70 is displayed as follows. For example, the microcomputer 41 generates a display control signal that causes the cursor indication to be displayed at a predetermined position. The display control signal is supplied to the display controlling section 35 through the system gate array 36 and the bus 34. The display controlling section 35 drives the display section 10 according to the display control signal. As a result, the cursor indication 70 is displayed. The position of the cursor indication 70 is moved and designated by operating for example the up key and/or down key of the key block 13.

In the example shown in FIG. 8A to FIG. 8D, the cursor indication 70 is generated by inverting the display color of a content name. However, the display method of the cursor indication 70 is not limited to this example. In other words, as long as the cursor indication 70 is displayed at a position of a content name, any method may be used. For example, the cursor indication 70 may be a predetermined mark that is displayed at the beginning of a content name.

Figure 8B:
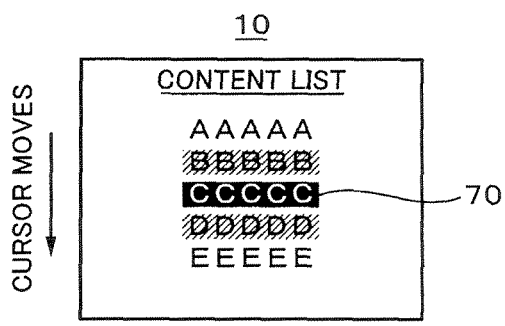

At step S11, it is determined whether the cursor indication 70 has been moved. For example, when the user has not performed a key input, for example, with the up key and down key of the key block 13 and the cursor indication 70 does not move, the flow advances to step S12. At step S12, the microcomputer 41 counts a time period T for which the cursor indication 70 has stayed at the position of any content name and determines whether the time period T exceeds a predetermined time period $T_{th}$. As shown in FIG. 8B, when the cursor indication 70 has moved to the position of a content name "CCCCC", the microcomputer 41 starts counting the time period T according to an output of the real time clock 46. Before the time period T exceeds the predetermined time period $T_{th}$, the microcomputer 41 determines whether the cursor indication 70 has moved from the position of the content name "CCCCC" to another position.

The predetermined time period $T_{th}$ is for example around 0.5 seconds. It is preferred that the value of the predetermined time period $T_{th}$ be changed by the user.

When the determined result at step S12 denotes that the time period T exceeds the predetermined time period $T_{th}$, the flow advances to step S13. At step S13, a part of content at the position of the current cursor indication 70 is reproduced. For example, when the cursor indication 70 has been moved to the position of the content name "CCCCC" shown in FIG. 8B and stayed at the position for the predetermined time period $T_{th}$ or longer as exemplified in FIG. 8C, a part of content data having the content name "CCCCC" is reproduced. The preview reproduction is performed for content having the content name "CCCCC".

In the preview reproduction, content data are reproduced from the beginning for a predetermined time period (for example, 10 seconds). Instead, after real content data are reproduced from the beginning for a predetermined time period, the reproduction may be stopped. Instead, a dedicated file for the preview reproduction may be created and the file may be reproduced. Instead, a preview reproduction position may differ in each content item. The dedicated file for the preview reproduction may be automatically created when content data are recorded to the hard disk drive 32.

After the preview reproduction for particular content has been completed, the preview reproduction for content at the next position may be automatically started. In the example shown in FIG. 8A to FIG. 8D, after the preview reproduction for content having the content name "CCCCC" has been completed and the cursor indication 70 has not been moved, the preview reproduction for content having the next content name "DDDDD" may be automatically started.

In addition, while the preview reproduction is being performed, the cursor indication 70 may be moved by a key operation. In this case, when the cursor indication 70 has been moved to the position of another content name and stayed for the predetermined time period $T_{th}$ or longer, the preview reproduction may be performed for content at the position of the cursor indication 70.

Figure 8C:
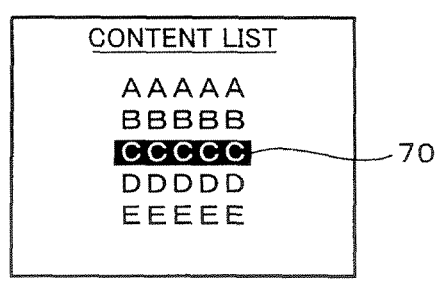
Figure 8D:
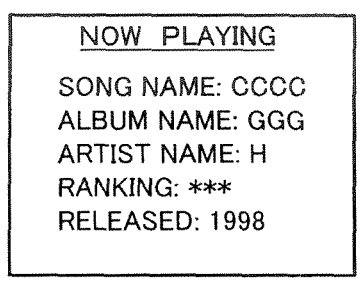

For example, as shown in FIG. 8C, while the preview reproduction is being performed for content having the content name "CCCCC" at the position of the cursor indication 70, it is moved by a key operation. The cursor indication 70 is moved through the position of the content name "DDDDD" within the predetermined time period $T_{th}$ and then stayed at the position of the content name "EEEEE". The microcomputer 41 counts the stop time period T of the cursor indication 70. When the stop time period T exceeds the predetermined time period $T_{th}$, the microcomputer 41 stops the preview reproduction for content having the content name "CCCCC" and starts the preview reproduction for content having the content name "EEEEE".

When the selected content is confirmed while the preview reproduction is being performed, the preview reproduction can be switched to the normal reproduction. When the preview reproduction is switched to the normal reproduction, the display section 10 displays an indication that describes that the normal reproduction is being performed as exemplified in FIG. 8D. In the example shown in FIG. 8D, the display section 10 displays text "Now Playing" that indicates that the normal reproduction is being performed. In addition, the display section 10 displays attribute information of content having the content name "CCCCC", which is being reproduced.

While the preview reproduction is being performed, when for example the enter key 13A is pressed, the selected content is confirmed. As a result, the preview reproduction is switched to the normal reproduction. Next, the process of switching from the preview reproduction to the normal reproduction will be described. In this case, there are two methods. In the first method, the normal reproduction is performed from the beginning of content data for which the preview reproduction was performed. In the second method, the normal reproduction is continued from the position of content data at which the preview reproduction was stopped.

Next, with reference to FIG. 9A and FIG. 9B, these methods will be described in brief. It is assumed that the time period for which the preview reproduction is performed is 10 seconds from the beginning of content, that the preview reproduction is successively and automatically performed for first, second, and third tracks of content data, and that the confirmation is performed in the middle of the preview reproduction for the third track.

Figure 9A:
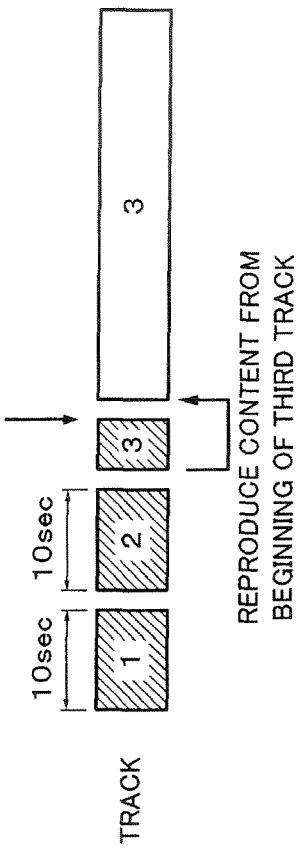
FIG. 9A and FIG. 9B are schematic diagrams describing a process of switching from a preview reproduction to a normal reproduction.

In the first method, as exemplified in FIG. 9A, when the confirmation is performed by operating for example the enter key 13A while the preview reproduction is being performed for the third track (namely, the reproduction operation is commanded), the preview reproduction for the third track is stopped. After a predetermined time period has elapsed, the whole third track of content data is reproduced from the beginning.

Figure 9B:
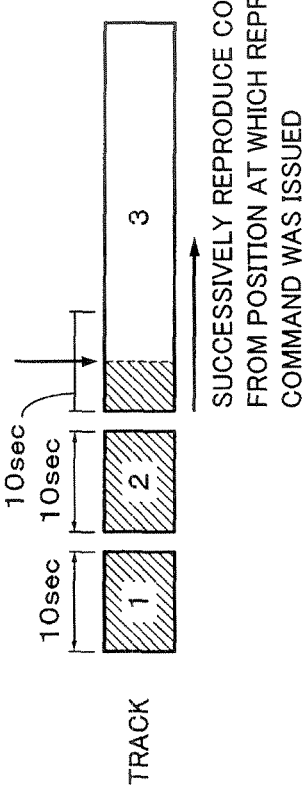

On the other hand, in the second method, as exemplified in FIG. 9B, when the confirmation is performed while the preview reproduction is being performed for the third track, the preview reproduction is stopped. The normal reproduction is successively performed from the position at which the preview reproduction for the third track was stopped.

In the foregoing description, a list of content recorded in the hard disk drive 32 is directly displayed on the display section 10. However, that structure is just an example. In other words, several hundred content items to several thousand content items can be recorded in the hard disk drive 32. With the automatic preview reproduction corresponding to the stop time period of the cursor indication 70 and the content attribute information, content can be easily retrieved from such a large amount of data.

1-4. Outlined Operation of Artist Link Mode

Next, as an example of the preview reproduction, a method of selecting content data using the foregoing artist link information will be described. In the following description, a mode of which content is retrieved and/or selected using artist link information is referred to as the artist link mode.

Figure 10:
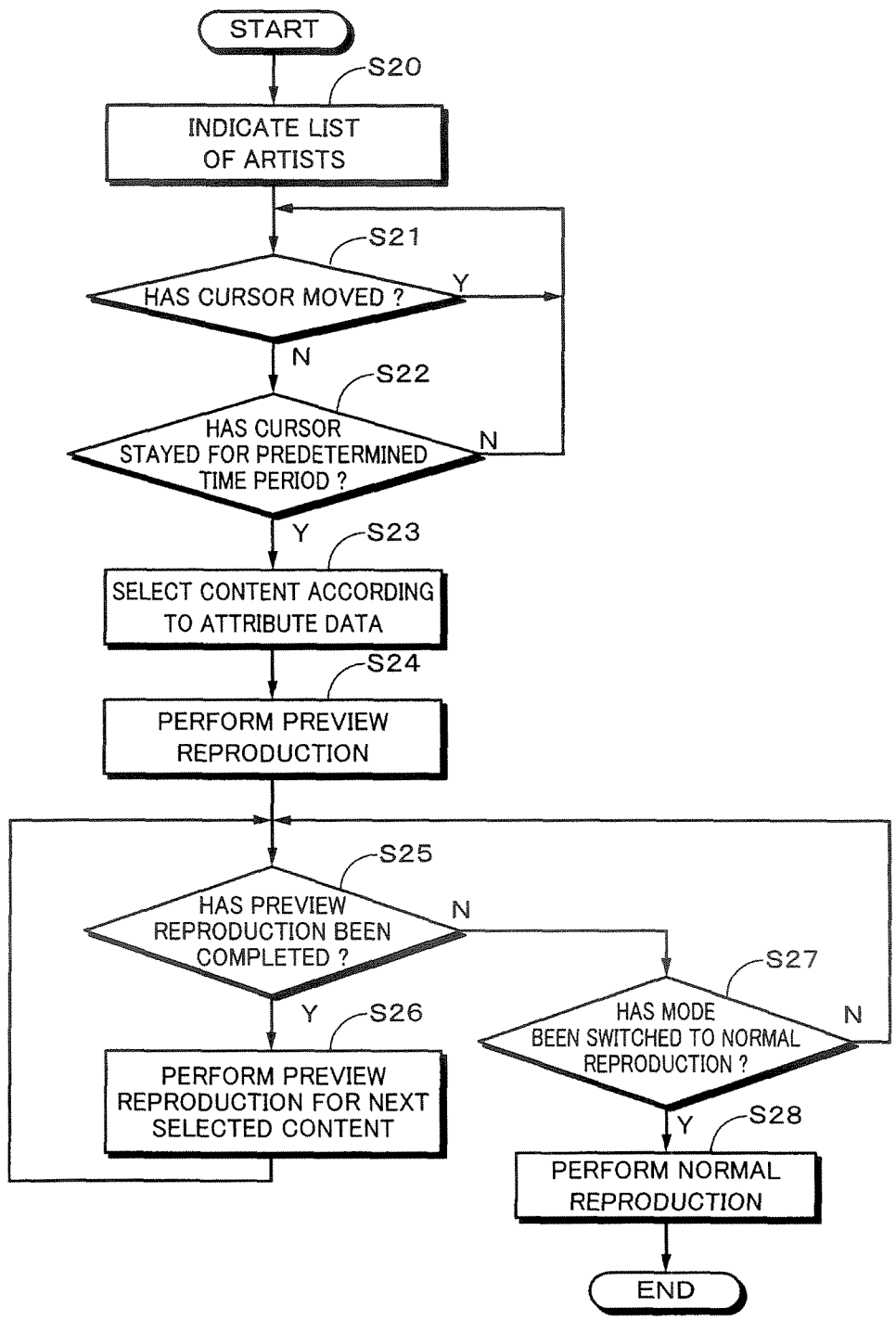
FIG. 10 is a flow chart showing an example of a process performed in an artist link mode.

FIG. 10 is a flow chart showing an example of a process preformed in the artist link mode. FIG. 11A to FIG. 11C and FIG. 12A to FIG. 12D show examples of transitions of indications of the display section 10 in the process shown in FIG. 10. It is assumed that the reproduction operation mode of the reproducing apparatus 1 is the normal reproduction mode and that the normal reproduction is being performed for content X of artist A. When for example the discovery button 14 is pressed, the artist link mode takes place. When the artist link mode takes place, the microcomputer 41 references artist link information and causes the display section 10 to display an artist link screen as exemplified in FIG. 11A. The artist link screen has a list indication portion 71A that indicates a list of artist A and artists B, C, and so forth correlated with artist A (at step S20).

In this example, with reference to the attribute information table, artist names are sorted and listed in the descending order of the number of content items recorded in the hard disk drive 32. The cursor indication 70 is displayed at the position of artist A. A reproduction content indication portion 71B indicates information about content that is currently being reproduced. The sorting order of artist names is not limited to this example. While the cursor indication 70 is displayed at the position of artist A, the normal reproduction is continued for content that was being reproduced in the normal reproduction mode immediately before the artist link mode took place (in this example, content X of artist A).

Figure 11A:
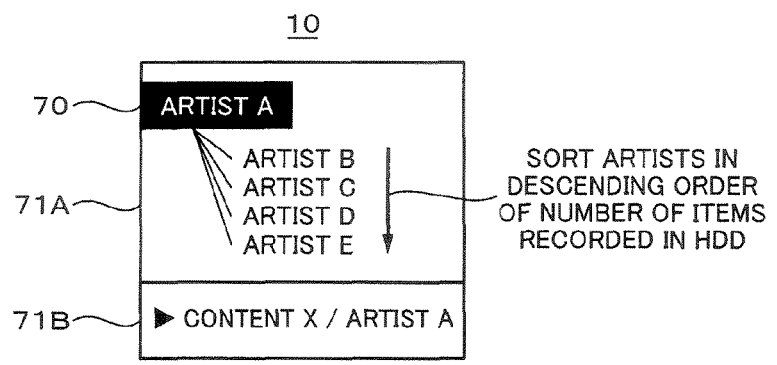
FIG. 11A, FIG. 11B, and FIG. 11C are schematic diagrams showing examples of transitions of indications in the process of the artist link mode.
Figure 11B:
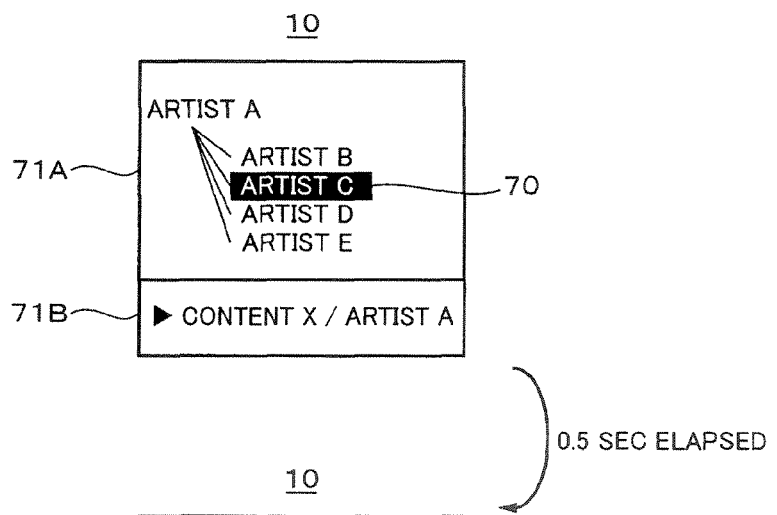
Figure 11C:
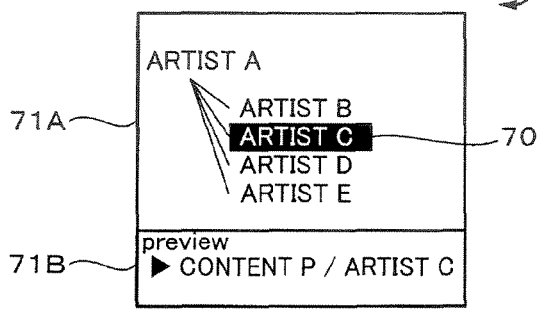

In this state, when for example the down key of the key block 13 is operated, as exemplified in FIG. 11B, the cursor indication 70 is successively moved to the positions of the correlated artists B, C, and so forth (at step S21). In addition, the artist link mode is switched to the preview reproduction mode. In the example shown in FIG. 11B, the cursor indication 70 is present at the position of artist C through the position of artist B within a predetermined time period (for example, 0.5 seconds) corresponding to the user's operation for the down key.

According to the counted result of the microcomputer 41, it is determined whether the cursor indication 70 has stayed at the position of artist C for the predetermined time period $T_{th}$ or longer (at step S22) When the determined result denotes that the stop time period T is equal to or longer than the predetermined time period $T_{th}$, the flow advances to step S23. At step S23, with reference to the attribute information table, content is automatically selected from content data correlated with the item at the position of the cursor indication 70 according to a predetermined rule.

For example, as shown in FIG. 11B, it is assumed that the cursor indication 70 is displayed at the position of "artist C" and content items P, Q, R, and S have been recorded as content of artist C in the hard disk drive 32. These content items P, Q, R, and S are sorted in the descending order of their ratings according to the attribute information table. As an item for the rating, the field "reproduction frequency" of the attribute information table is used. Content items are sorted in the descending order of their reproduction frequencies. Instead, content items may be sorted in the order of their popularities using the field "ranking information" of the attribute information table. Instead, content items may be rated with their favorite rates according to the number of times each content item was reproduced and the number of times it was skipped obtained from the reproduction history. It is preferred that the user freely assign an item to be rated. At step S23, the microcomputer 41 automatically selects content item P that has for example the highest rating.

Thereafter, the flow advances to step S24. At step S24, the preview reproduction for the selected content item P is performed. At step S24, the display section 10 still displays the artist link screen. The reproduction content indication portion 71B indicates information about content for which the preview reproduction is being performed (see FIG. 11C).

Thereafter, the flow advances to step S25. At step S25, while the cursor indication 70 is displayed at the position of artist C, it is determined whether the preview reproduction for content item P has been completed. When the determined result at step S25 denotes that the preview reproduction for content item P has been completed, the flow advances to step S26. At step S26, the preview reproduction for the next selected content item is automatically performed. The preview reproduction for the content item having the next highly rating after content item P (for example, content item Q) is automatically performed. The display section 10 still displays the artist link screen. The reproduction content indication portion 71B indicates information about a content item for which the preview reproduction is being preformed (see FIG. 12A). Thereafter, the flow returns to step S25.

After the preview reproduction for all content items recorded in the hard disk drive 32 for artist C at the position of the cursor indication 70 has been completed, the preview reproduction for a content item of the next artist (for example, artist D) is automatically performed (step S25 and step S26 are repeated). At this point, the display section 10 still displays the artist link screen. In the list indication portion 71A, the cursor indication 70 is automatically moved to the position of artist D (see FIG. 12B). The reproduction content indication portion 71B indicates information about content item T for which the preview reproduction is currently being performed.

In contrast, when the determined result at step S25 denotes that the preview reproduction is being performed, the flow advances to step S27. At step S27, it is determined whether to switch the preview reproduction mode to the normal reproduction mode.

Figure 12A:
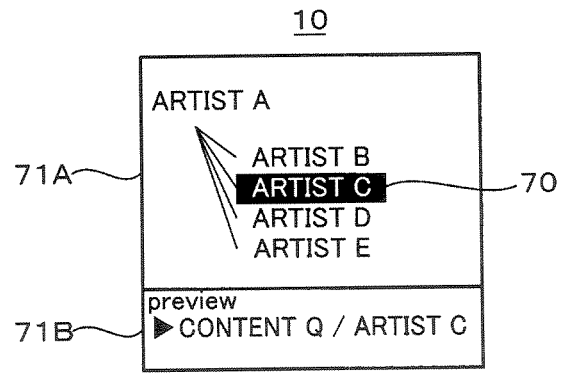
FIG. 12A, FIG. 12B, FIG. 12C, and FIG. 12D are schematic diagrams showing examples of transitions of indications in the process of the artist link mode.
Figure 12B:
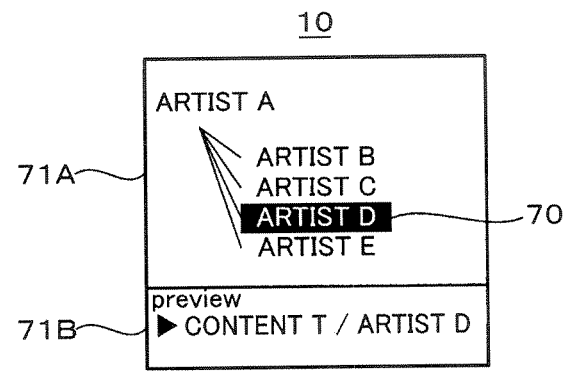
Figure 12C:
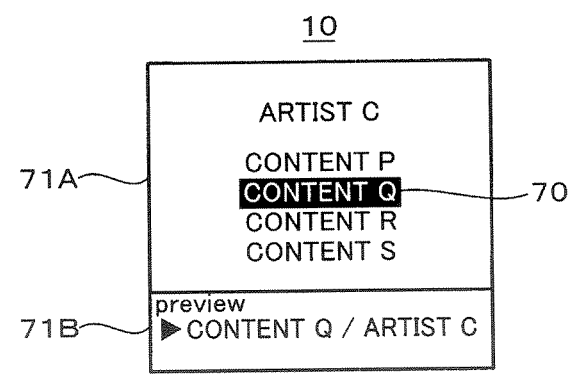
Figure 12D:
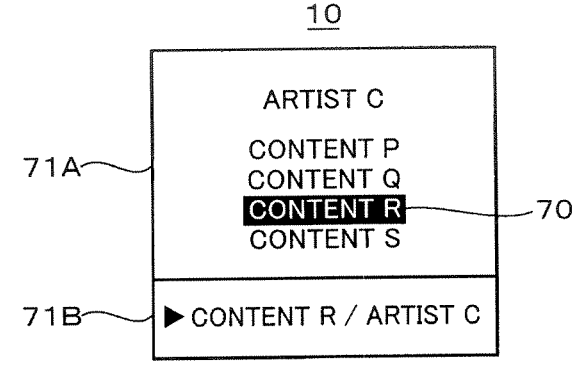

When the confirmation is performed for example with the enter key 13A in the state shown in FIG. 12A, the artist link screen is switched to the content list screen on the display section 10 as exemplified in FIG. 12C. A content item of artist C can be selected on the content list screen. The list indication portion 71A on the content list screen indicates a list of content items of artist C. The reproduction content indication portion 71B on the content list screen indicates information about a content item for which the preview reproduction is currently being performed.

When the confirmation for the content item is performed, for example, with the enter key 13A in the state shown in FIG. 12B, it is determined that the reproduction mode be switched to the normal reproduction mode. The flow advances to step S28. At step S28, the normal reproduction is performed for content item Q for which the preview reproduction is currently being performed. The display section 10 still displays the content list screen. The reproduction content indication portion 71B on the content list screen indicates information about the content item selected for the normal reproduction (FIG. 12C). After the normal reproduction is preformed for content item Q, the value of the field "reproduction frequency" of the record corresponding to content item Q on the attribute information table is updated so that the value represents the reproduction.

Unless the normal reproduction is commanded, the flow returns to step S25. At step S25, the preview reproduction is continued. After the preview reproduction for content item Q has been completed, if the cursor indication 70 is not moved, the preview reproduction for content item R that has the next highest rating is automatically started. The cursor indication 70 is moved to the position of content item R.

When the determined result at step S25 denotes that the preview reproduction is being performed, in the state of which the artist link screen shown in FIG. 12A is displayed, by moving the cursor indication 70, another artist can be selected. In other words, when the determined result at step S25 denotes that the preview reproduction is being performed and the cursor indication 70 has been moved, the flow returns to step S23. At step S23, the preview reproduction for a content item of an artist at the position of the cursor indication 70 can be performed.

As described above, according to the foregoing embodiment, only by moving the cursor indication 70 on an artist name and staying the cursor indication 70 thereon for a predetermined time period, the preview reproduction can be automatically performed for the content item of the artist at the position of the cursor indication 70.

2. More Specific Operation in Artist Link Mode and GUI

Next, an operation in the artist link mode and its graphical user interface (GUI) will be described with a specific example. As described above, artist link information can be formed in levels according to correlation rates of artists. In the following description, it is assumed that the artist link information is formed in two levels of first artist link information that is strongly correlated with a particular artist and second artist link information that is weakly correlated with the particular artist.

Figure 13:
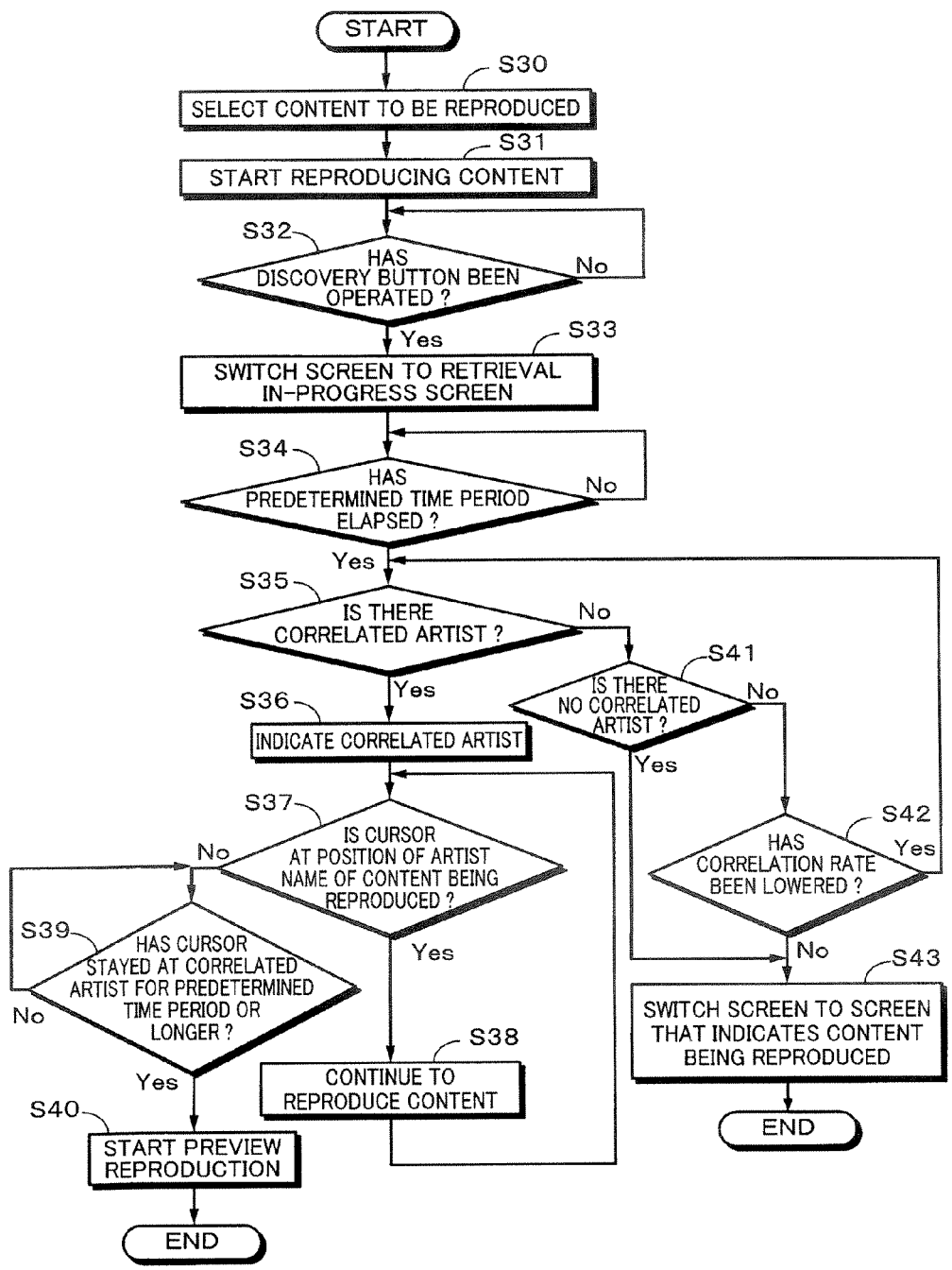
FIG. 13 is a flow chart showing a process of starting the artist link mode while particular content data are being reproduced.

FIG. 13 is a flow chart showing an example of a process of which the artist link mode is started by pressing the discovery button 14 while particular content data are being reproduced. Before the process of the flow chart shown in FIG. 13 is performed, it is assumed that a list of content items of a particular artist ("Police") recorded in the hard disk drive 32 is displayed on the display section 10. In the following description, an artist (in this example, "Police") that has been selected before the process of the flow chart shown in FIG. 13 is performed is called an objective artist. Artists described in artist link information corresponding to the objective artist is called correlated artists.

At step S30, the cursor indication 70 is moved, for example, with the up key and/or down key of the key block 13. Desired content item is selected from the content list. When the cursor indication 70 is moved to a position of content to be reproduced ("Every Breath You"), by pressing for example the enter key 13A, the normal reproduction for the content item corresponding to the cursor indication 70 is started (at step S31).

Figure 14:
FIG. 14 is a schematic diagram showing an example of a normal reproduction screen.

At this point, the display section 10 displays a normal reproduction screen that indicates a content item for which the normal reproduction is performed. FIG. 14 shows an example of a normal reproduction screen 100. The normal reproduction screen has a list display section 71A that indicates a content name ("Every Breath You"), an album name of an album that contains a content item ("The Police best"), an artist name ("The Police"), a genre to which the content item belongs ("Rock"), and the current reproduction time ("00:02") of the content item along with icons that represent meanings of these information.

In the following example, an icon of a musical note represents a content name. An icon of a disc represents an album name. An icon of a humans bust-up represents an artist name. An icon of a boxed musical note represents a genre. The meanings of these icons are common in each screen of the display section 10.

The list indication portion 71A also indicates the rating of a content item that is being reproduced with stars. In addition, the list indication portion 71A indicates the year in which the content was released. In addition, the reproduction content indication portion 71B briefly indicates information about a content item that is currently being reproduced and information about elapsed time after the reproduction of the content item. In these drawings, the list indication portion 71A and the reproduction content indication portion 71B are separately shown. However, in reality, they are displayed as different areas on one screen of the display section 10.

When it has been determined that the discovery button 14 has been operated during the reproduction of content data (at step S32), the operation mode of the reproducing apparatus 1 is switched to the artist link mode. In the artist link mode, information about an artist strongly correlated with the artist of the content item that is being reproduced is retrieved. In addition, the current screen of the display section 10 is switched to a retrieval in-progress screen 101 as exemplified in FIG. 15.

Figure 15:
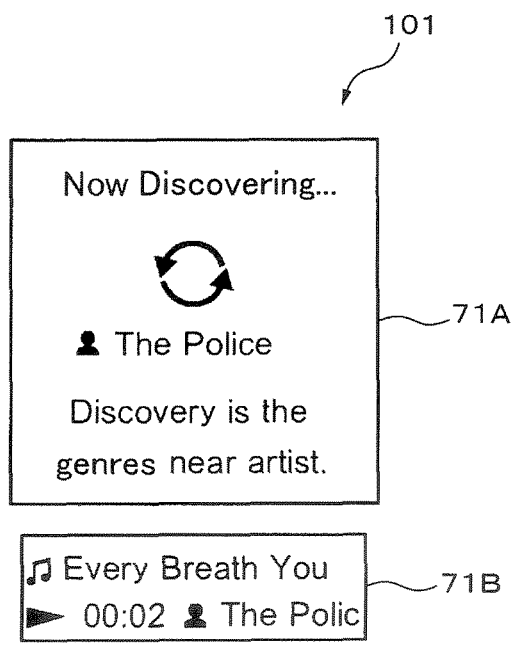
FIG. 15 is a schematic diagram showing an example of a retrieval in-progress screen.

The retrieval in-progress screen 101 indicates an artist name ("The Police") for which correlated artists are retrieved according to artist link information, a message of text indicating that retrieval is in progress, and an icon (two rotating semi-circular arrows shown in FIG. 15). The reproduction for the content item is continued. The reproduction content indication portion 71B indicates information about the content item currently being reproduced.

When it has been determined that a predetermined time period has elapsed after the retrieval in-progress screen 101 has appeared (at step S34), the flow advances to step S35. At step S35, it is determined whether there is first artist link information that is information about an artist strongly correlated with the artist of content data that are currently being reproduced according to the retrieved result at step S33. When the determined result denotes that there is the first artist link information, the flow advances to step S36.

When the determined result at step S35 denotes that there is no strongly correlated artist information, the flow advances to step S41. At step S41, it is determined whether there is first artist link information for the artist of the content item that is currently being reproduced and second artist link information as correlated artist link information weakly correlated with the objective artist. When the determined result denotes that there is neither the first artist link information nor the second artist link information for the objective artist, the flow advances to step S43.

In contrast, when the determined result at step S41 denotes that there is the second artist link information for the objective artist, the flow advances to step S42. At step S42, the display section 10 displays a screen 102 (see FIG. 16) to prompt the user whether to lower the correlation rate of artist link information for the objective artist. In the example shown in FIG. 16, the list indication portion 71A of the display section 10 indicates text that asks the user whether to lower (raise) the correlation rate and to indicate the correlated artist link information and a key for which the user operates (for example, the discovery button 14).

At step S42, the reproduction for the content data item is continued in the normal reproduction mode. The reproduction content indication portion 71B indicates information about the content item that is currently being reproduced.

When the discovery button 14 or the enter key 13A has been operated at step S42 to lower the correlation rate and indicate the correlated artist link information, the artist link information for the objective artist is switched from the first artist link information to the second artist link information. Thereafter, the flow returns to step S35.

In contrast, when it has been decided not to lower the correlation rate at step S42, the flow advances to step S43. At step S43, the screen of the display section 10 is returned to the screen, shown in FIG. 14, that indicates information about the content item that is currently being reproduced. The reproduction for the content item is continued in the normal reproduction mode.

Figure 16:
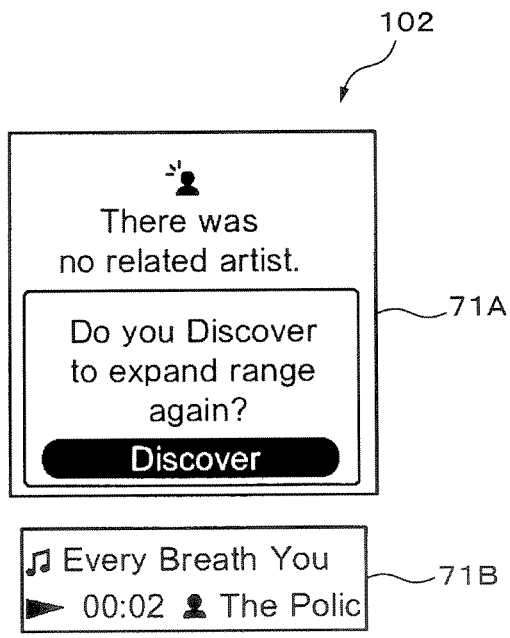
FIG. 16 is a schematic diagram showing an example of a screen that prompts the user whether to lower a correlation rate.
Figure 17:
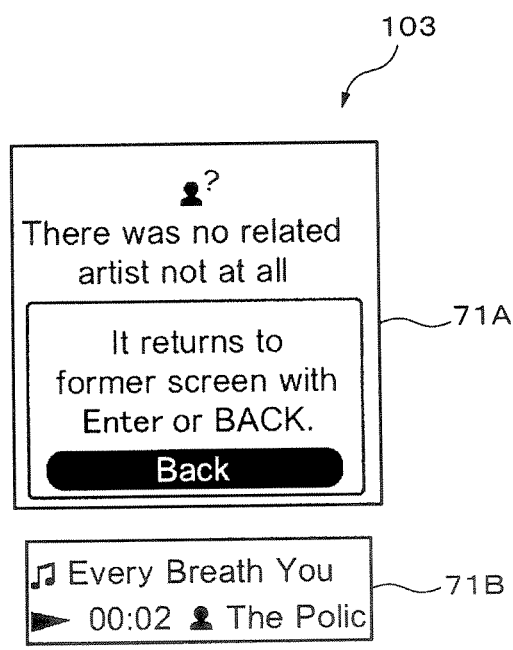
FIG. 17 is a schematic diagram showing an example of a screen that prompts the user to return to a screen that displays content that is currently being reproduced.

When the user operates the discovery button 14 in the state shown in FIG. 16 on the display section 10 at step S42, the correlation rate is not lowered. As exemplified in FIG. 17, the screen of the display section 10 is switched to a screen 103 that prompts the user to return to the screen that indicates information about the content item that is currently being reproduced. In the example shown in FIG. 17, the list indication portion 71A of the display section 10 indicates text describing that there is neither first artist information and second artist information for the objective artist and a key for which the user operates (for example, the key 12).

When the determined result at step S35 denotes that there is correlated artist information for a correlated artist of the objective artist according to the artist link information, the flow advances to step S36.

Figure 18:
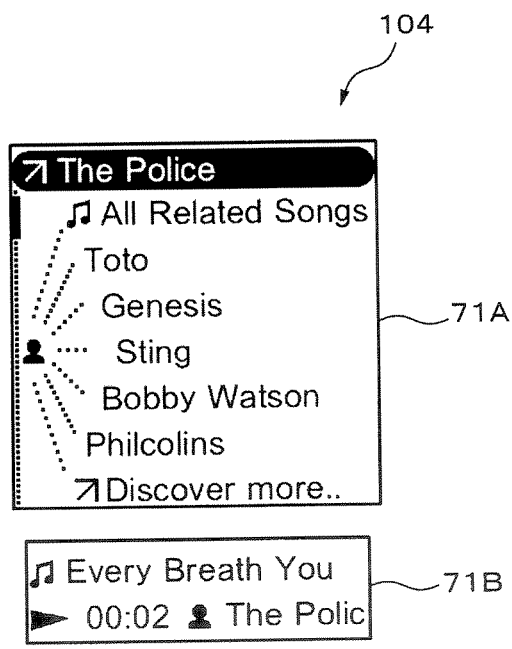
FIG. 18 is a schematic diagram showing an example of a correlated artist information display screen.

At step S36, the screen of the display section 10 is switched to a correlated artist information indication screen 104 that indicates correlated artist information as exemplified in FIG. 18. The correlated artist information indication screen 104 indicates correlated artist information corresponding to the first artist link information or the second artist link information depending on branches to step S35, step S41, or step S42.

In the example shown in FIG. 18, the top portion of the correlated artist information indication screen 104 indicates an objective artist name of correlated artist information along with the cursor indication 70. In addition, the correlated artist information indication screen 104 indicates a list of correlated artist information of the objective artist according to the first artist link information or second artist link information. In the example shown in FIG. 18, correlated artist information according to the first artist link information or second artist link information is connected to an icon 75 of the objective artist with dotted lines.

In FIG. 18, when the artist link information of the objective artist exceeds the size of one screen, by operating a key of the operation section 20 in a predetermined manner, artist information that does not appears on the current screen can be indicated on the display section 10. For example, whenever the down key of the key block 13 is operated to move the cursor indication 70 to a predetermined position in the list indication portion 71A (in the example shown in FIG. 18, the position "Discover more . . . "), the correlated artist information indicated in the list indication portion 71A is scrolled for one entry.

At step S37, it is determined whether the correlated artist information indication screen 104 indicates the cursor indication 70 at the position of the artist name of the content item that is currently being reproduced. In other words, the user can move the cursor indication 70 to the position of his or her desired artist with the up key and down key of the key block 13 on the correlated artist information indication screen 104. When the cursor indication 70 is present at the position of the original artist name (in this example "The Police") on the correlated artist information display screen, the reproduction for the content item is continued in the normal reproduction mode (at step S38).

Figure 19A:
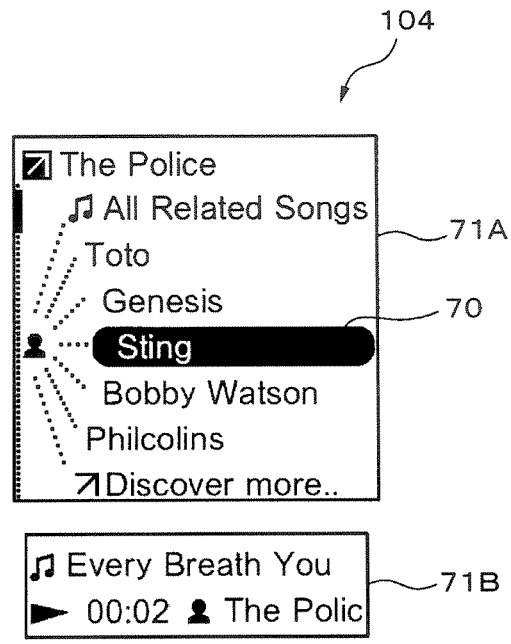
FIG. 19A and FIG. 19B are schematic diagrams showing examples of the correlated artist information display screen.

When the determined result denotes that the cursor indication 70 has been moved from the position of the artist name of the content item that is currently being reproduced, the flow advances to step S39. When the user operates for example the down key, the cursor indication 70 is moved. As exemplified in FIG. 19A, the cursor indication 70 appears at the position of an artist name ("Sting") that is different from the artist name of the content item that is currently being reproduced.

Figure 19B:
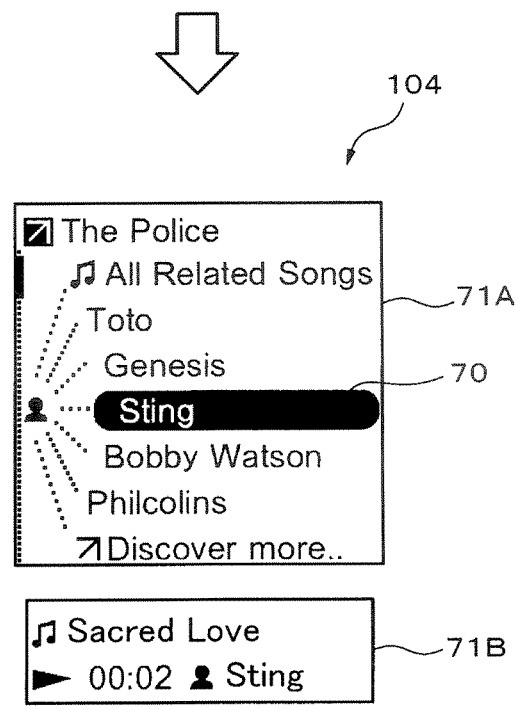

At step S39, it is determined whether the cursor indication 70 has stayed for a predetermined time period at the position of the correlated artist name to which the cursor indication 70 has moved. When the determined result denotes that the cursor indication 70 has stayed for the predetermined time period, the flow advances to step S40. At step S40, the reproduction mode is switched from the normal reproduction mode to the preview reproduction mode. The artist name at the position of the cursor indication 70 is designated as the selected artist name. The preview reproduction for the content item of the artist name (in this example, "Sacred Love") is automatically performed. As exemplified in FIG. 19B, the reproduction content indication portion 71B of the display section 10 indicates information about the newly selected and reproduced content item.

3. Correlated Information Notifying Method According to First Embodiment of Present Invention Next, a correlated information notifying method according to a first embodiment of the present invention will be described. According to this embodiment, when the reproducing apparatus 1 reproduces content, if a content item correlated with a content item that is reproduced has been recorded in the reproducing apparatus 1, the reproducing apparatus 1 notifies the user of the correlated content item. Thus, the user can know whether a content item correlated with a content item that is currently being reproduced has been recorded in the reproducing apparatus 1 without necessity of performing a content retrieval operation.

Figure 20:
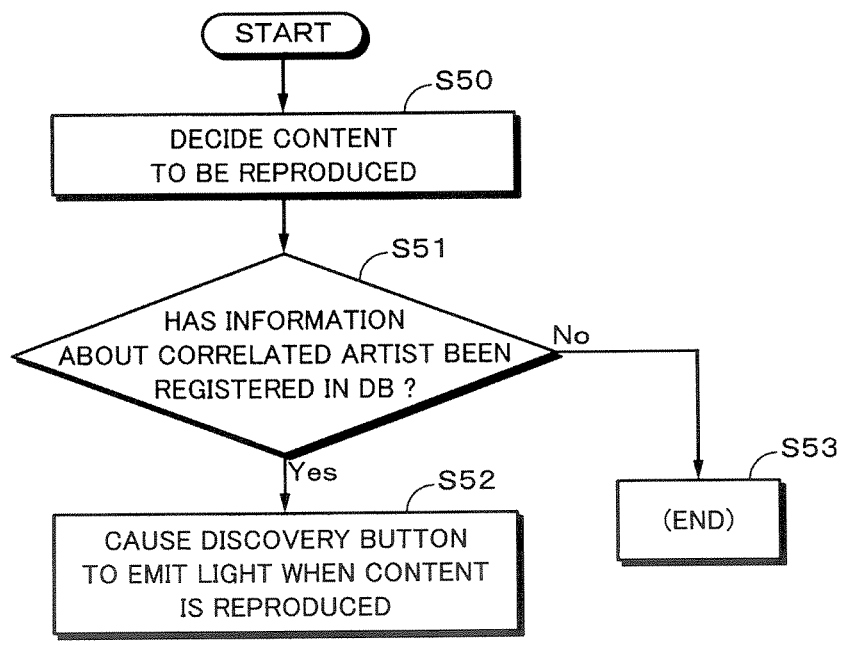
FIG. 20 is a flow chart showing an example of the operation of a correlated information notifying method according to a first embodiment of the present invention.

FIG. 20 is a flow chart showing an example of an operation of the correlated information notifying method according to the first embodiment of the present invention. When the reproducing apparatus 1 has decided a content item to be reproduced in a predetermined manner (at step S50), the flow advances to step S51. At step S51, with reference to the database that manages content recorded in the reproducing apparatus 1, it is determined whether a content item correlated with the content item decided to be reproduced has been recorded in the reproducing apparatus 1.

For example, with reference to the database according to a content ID of the content item decided to be reproduced, information about an artist strongly correlated with the artist of the content item decided to be reproduced is retrieved. When the retrieved result denotes that information about the artist strongly correlated with the artist of the content item decided to be reproduced has been registered in the database, it can be determined that a content item correlated with the content item decided to be reproduced has been recorded in the reproducing apparatus 1.

When the determined result at step S51 denotes that a content item correlated with the content item decided to be reproduced has been recorded in the reproducing apparatus 1, the flow advances to step S52. At step S52, a process that notifies the user that a correlated content item has been recorded in the reproducing apparatus 1 is performed. According to this embodiment, this notifying process is performed by turning on the lighting section 15 of the discovery button 14 disposed on one side of the reproducing apparatus 1 in a predetermined manner.

For example, at step S52, when the content item decided to be reproduced at step S50 is reproduced, the microcomputer 41 generates a light control signal that causes the lighting section 15 of the discovery button 14 to emit light in a predetermined manner. The control signal is supplied to the lighting section 15. As a result, the lighting section 15 emits light. As the lighting section 15 emits light, the user knows that there is a content item correlated with the content item that is currently being reproduced.

When the notifying process is performed by turning on the lighting section 15 of the discovery button 14, it is preferred that the lighting section 15 automatically stops emitting light after a predetermined time period has elapsed to reduce the power consumption of a battery of the reproducing apparatus 1. The lighting section 15 may emits light when the content item decided to be reproduced at step S50 is reproduced. It is thought that the lighting section 15 emits light with a delay after the content is reproduced. Instead, the lighting section 15 may emit light for a predetermined time period of the last portion of the content item that is being reproduced. Instead, while the content item decided to be reproduced at step S50 is being reproduced, the lighting section 15 may emit light. Instead, until the user performs the next operation for the reproducing apparatus 1, the lighting section 15 may continuously emit light.

When the determined result at step S51 denotes that a content item correlated with the content item decided to be reproduced has not been recorded in the reproducing apparatus 1, the flow advances to step S53. At step S53, the correlated information notifying process is completed. The content item decided to be reproduced at step S50 is reproduced regardless of the determined result at step S51.

After the user has been notified at step S52, when he or she presses for example the discovery button 14, the operation mode can be switched to the foregoing artist link mode. In this case, the screen of the display section 10 is switched to the artist link screen. The list indication portion 71A indicates the artist of the content item decided to be reproduced at step S50 and a list of artists strongly correlated with the objective artist, retrieved at step S51. When a plurality of artists strongly correlated with the objective artist have been retrieved at step S51, the list indication portion 71A indicates a list of artists strongly correlated with the objective artist in a predetermined order.

The lighting section 15 and the discovery button 14 are integrated. Thus, when the user is notified of a correlated content item, since the lighting section 15 illuminates the discovery button 14 that he or she operates, he or she can correctly operate the lighting section 15.

4. Correlated Information Notifying Method According to Second Embodiment of Present Invention Next, a correlated information notifying method according to a second embodiment of the present invention will be described. According to the second embodiment, when the user is notified of a content item correlated with a content item to be reproduced, a result that is likely to be more effective for him or her is obtained.

As a specific example, when a user's evaluation value for a content item to be reproduced exceeds a predetermined value, it is determined whether there is a correlated content item. In addition, it is assumed that a correlated content item to be determined is strongly correlated with a content item to be reproduced and the user has not yet evaluated the correlated content item. Thus, the user can be notified of only a correlated content item he or she thinks that it is useful.

A content item that the user has not yet evaluated is a content item that has been reproduced without calculation of the favorite rate in the field "rating", for example, a content item for which only the preview reproduction was performed or a content item which was selected by the user, but whose reproduction was stopped by him or her within a predetermined time period.

Figure 21:
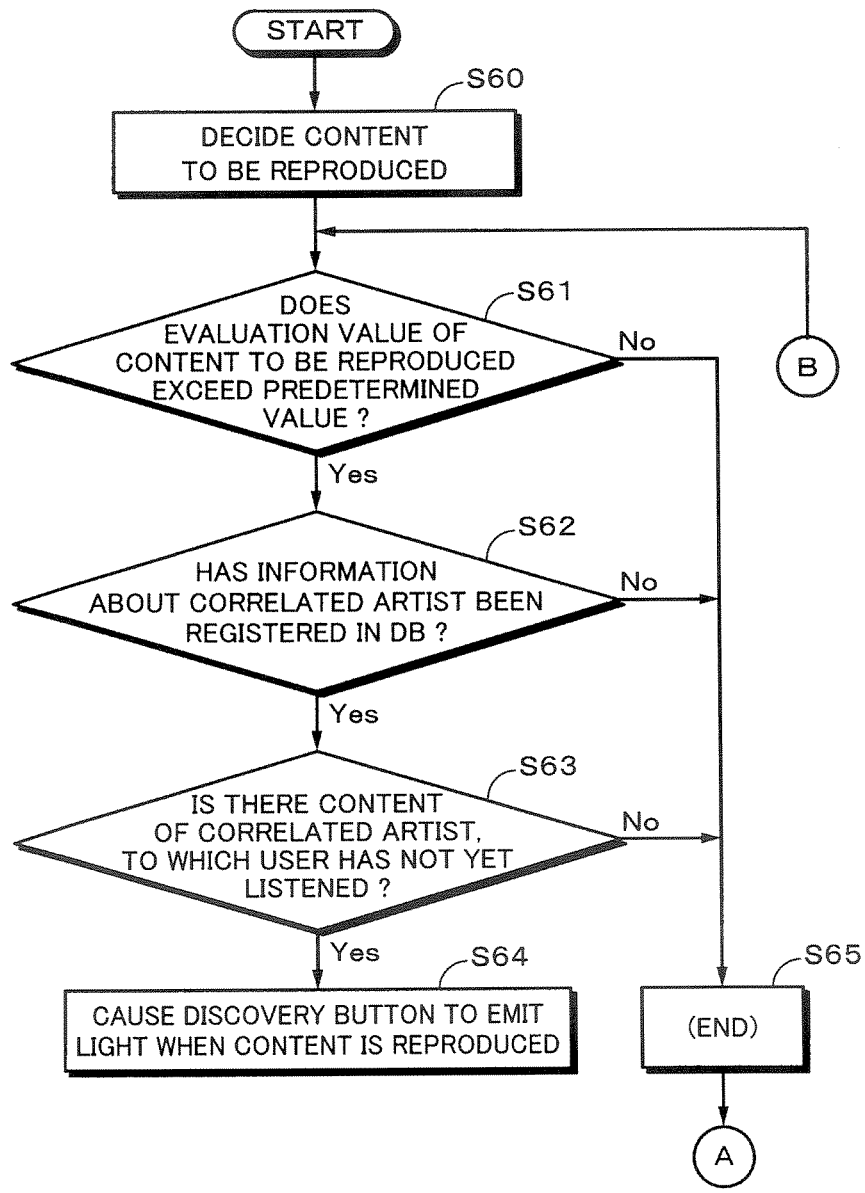
FIG. 21 is a flow chart showing an example of the operation of a correlated information notifying method according to a second embodiment of the present invention.

FIG. 21 is a flow chart showing an example of the operation of the correlated information notifying method according to the second embodiment of the present invention. In the flow chart shown in FIG. 21, letter "A" denotes an entrance to a flow chart shown in FIG. 24, whereas letter "B" denotes an entrance from the flow chart shown in FIG. 24.

In the reproducing apparatus 1, when a content item to be reproduced is decided in a predetermined manner (at step S60), the flow advances to step S61. At step S61, it is determined whether a user's evaluation value for the content item decided to be reproduced at step 60 exceeds a predetermined value. When the determined result denotes that the user's evaluation value is equal to or lower than the predetermined value, the flow advances to step S65. At step S65, the user is not notified of a correlated content item.

As a user's evaluation value for a content item, the value of the field "rating" of the attribute information table of the content can be used. It is assumed that value "5" of the field "rating" is the highest evaluation value in values "5" to "0". In this case, when the value of the field "rating" is "4" or greater, namely "4" or "5", it can be determined that the user's evaluation value is equal to or greater than the predetermined value. Instead, the value of the field "reproduction frequency" may be used as the user's evaluation value.

In contrast, when the determined result at step S61 denotes that the user's evaluation value for the content item decided to be reproduced is equal to or greater than the predetermined value, the flow advances to step S62. At step S62, with reference to the database that manages content recorded in the reproducing apparatus 1, it is determined whether a content item correlated with the content item decided to be reproduced has been recorded in the reproducing apparatus 1. When the determined result denotes that a correlated content item has not been recorded in the reproducing apparatus 1, the flow advances to step S65. At step S65, the user is not notified of correlated content.

Like the first embodiment, with reference to the database according to a content ID, information about an artist strongly correlated with the artist of a content item decided to be reproduced is retrieved. When the retrieved result denotes that information of the artist strongly correlated with the artist of the content item decided to be reproduced has been registered in the database, it can be determined that a content item correlated with the content item decided to be reproduced has been recorded in the reproducing apparatus 1.

When information about an artist strongly correlated with the artist of the content item decided to be reproduced is retrieved, retrieval conditions can be further narrowed. It may be thought that artist information is narrowed for example with respect to a genre of the content item decided to be reproduced. For example, artists of content items whose genre is the same as that of the content item decided to be reproduced or artists of content items whose genres match greater than a predetermined percent of those of content of the artist of the content item decided to be reproduced are further retrieved. When a genre is a retrieval condition, it is thought that a retrieved result can be more suitably obtained when the foregoing small genres are used. Thus, it can be expected that a retrieved result that more satisfies a user's preference is obtained.

In contrast, when the determined result at step S62 denotes that a correlated content item has been recorded in the reproducing apparatus 1, the flow advances to step S63. At step S63, it is determined whether there is a content item to which the user has not yet listened or that he or she has not yet evaluated in content of the strongly correlated artists retrieved at step S62. When the determined result denotes that there is a content item to which the user has not yet listened or that he or she has not yet evaluated, the flow advances to step S65. At step S65, the user is not notified of a correlated content item.

It can be determined whether there is a content item to which the user has not yet listened or that he or she has not yet evaluated according to the value of the field "reproduction frequency" of the attribute information table for each content item of retrieved strongly correlated artists. When the value of the field "reproduction frequency" is "0", it can be determined that the user has not yet listened to or has not yet evaluated the content item.

Instead, it may be thought that when the value of the field "reproduction frequency" is equal to or lower than a predetermined value, the user has not yet listened to or has not yet evaluated the content item. Instead, according to a reproduction history recorded as a log file, it may be thought that when a predetermined time period has elapsed after the content item has been reproduced, the user has not yet listened to or has not yet evaluated the content item.

When the determined result at step S63 denotes that there is a content item to which the user has not yet listened in content items of strongly correlated artists retrieved at step S62, the flow advances to step S64. At step S64, for example, the lighting section 15 of the discovery button 14 emits light, notifying the user that a correlated content item has been recorded in the reproducing apparatus 1. The illumination period and illumination timing of the lighting section 15 may be set in the same manner as those of the first embodiment.

When the user is notified of correlated content items and presses the discovery button 14, the operation mode of the reproducing apparatus 1 is switched to the artist link mode. When the operation mode of the reproducing apparatus 1 has been switched to the artist link mode, as described above, the display section 10 displays the artist link screen. When the user selects a predetermined artist on the artist link screen, the display section 10 displays the content list screen that indicates a list of content items of the selected artist.

According to the second embodiment, it is preferred that a content item to which the user has not yet listened or has not yet evaluated is highlighted in content items indicated as the list on the content list screen. It may be thought that a content item to which the user has not yet listened or that he or she has not yet evaluated is indicated in a different style from that of other content items, for example, with solid letters, italic letters, or shadowed letters. Instead, a predetermined icon or mark may be added to a content name. Thus, the user can very easily find a content item to which he or she has not yet listened or that he or she has not yet evaluated.

Information other than the presence of a correlated content item may be indicated with an illumination pattern of the lighting section 15. For example, the illumination pattern of the lighting section 15 may be changed according to the evaluation value of a content item to be reproduced, obtained at step S61. Thus, the user can determine whether to press the discovery button 14 and switch the mode to the artist link mode according to the illumination pattern of the lighting section 15.

For example, it may be thought that the illumination intervals of the lighting section 15 is changed according to the obtained evaluation value. More specifically, assuming that value "5" of the field "rating" is the maximum value in evaluation values "0" to "5", when the evaluation value is "5", the lighting section 15 may emit light at intervals of 0.5 seconds. When the evaluation value is "4", the lighting section 15 may emit light at intervals of one second. Instead, it may be thought that the lighting section 15 has a plurality of light emission devices having different illumination colors so that they can be independently tuned on and their illumination colors can be chanced according to the evaluation value.

In the foregoing example, when the discovery button 14 is pressed at step S64, the operation mode is switched to the artist link mode. However, the operation mode may not be switched to other than the artist link mode. For example, when the discovery button 14 is pressed at step S64, a content item to which the user has not yet listened or that he or she has not yet evaluated may be directly reproduced. When a plurality of content items to which the user has not yet listened or that he or she has not yet evaluated have been retrieved, it may be thought that they are reproduced successively in a predetermined order. At this point, the foregoing preview reproduction may be performed.

4-1. Example of which Second Embodiment is Applied to Subscription Service

As with the second embodiment, it is suitable to add a condition of which the user has not yet listened to a content item to retrieval conditions when he or she uses a subscription service under a contract made with a content provider that allows he or she can reproduce downloaded content in a predetermined time period.

Next, the subscription service will be briefly described. For example, the user pays the service provider (for example, the music server 4) a flat fee and makes a predetermined service contact with the service provider. On the other hand, the service provider encrypts content in a predetermined manner and stores it as subscription content. The service provider allows the contacted user to download the subscription content. In addition, the service provider sends a decryption key for encrypted subscription content to the contracted user, for example, through the Internet 3. The key is assigned an expiration date. After the key expiration date has reached, content is not able to be decrypted with the key.

The user records the downloaded subscription content and its key to the reproducing apparatus 1. When the user selects the downloaded subscription content to be reproduced, the reproducing apparatus 1 decrypts the subscription content with the key and reproduces the subscription content.

Figure 22:
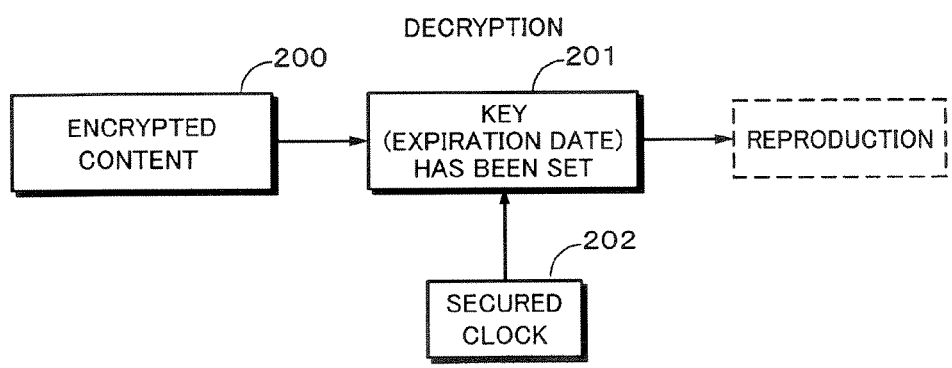
FIG. 22 is a schematic diagram describing a subscription service.

In other words, as exemplified in FIG. 22, before the expiration date, encrypted content 200 recorded in the reproducing apparatus 1 is decrypted with a key 201 assigned an expiration date and reproduced. The expiration date of the key 201 is managed by a secure clock 202 whose time is not able to be changed by the user. When the encrypted content 200 is reproduced, the assigned expiration date of the key 201 is compared with the current time counted by the secure clock 202. When the current time is earlier than the assigned expiration date of the key 201, the encrypted content 200 is decrypted with the key 201. In contrast, when the current time is later than the assigned expiration date of the key 201, the encrypted content 200, which is an encrypted audio file, is not decrypted with the key 201.

When the expiration date of the subscription content has reached, the user can pay the content provider a predetermined amount of money to extend the expiration date of the subscription content. As a result, the expiration date of the subscription content is extended. Thus, the encrypted content 200 can be decrypted with the key 201 and the subscription content can be reproduced.

As a subscription service, the service provider side provides a service that automatically transfers subscription content to the user. The service provider side prepares content according to a user's preference as subscription content. When the PC 2 is connected to the music server 4 through the Internet 3, the prepared content is transferred to the PC 2. When the user connects the reproducing apparatus 1 to the PC 2, the subscription content is automatically transferred from the PC 2 to the reproducing apparatus 1.

The reproducing apparatus 1 creates a list of content items transferred in a predetermined area from the current date until a predetermined past date as a latest transferred content list. The list of content items includes the foregoing subscription content that has been transferred. The predetermined time period is for example one week, 10 days, one month, or the like. The latest transferred content list of content transferred by the subscription service may be used as a auto play list.

As described above, as the subscription service, subscription content that the service provider has properly selected is automatically downloaded from the music server 4 to the PC 2. The downloaded subscription content is automatically transferred from the PC 2 to the reproducing apparatus 1. Thus, there is a high possibility of which content (subscription content) that the user does not recognize has been recorded in the PC 2 and the reproducing apparatus 1. Since the user does not know the content, it may not be selected by the user and not be reproduced.

As described above, the subscription service may normally assign content a reproduction expiration date. If there is much subscription content that is not reproduced until the reproduction expiration date, the user wastes money for the subscription content. In addition, the user may lose an opportunity of knowing new content.

Since a condition of whether the user has not yet listened to content is used as a retrieval condition, the possibility of which content that the user does not recognize and to which he or she has not yet listened is retrieved becomes high. Thus, the user does not waste money for the subscription content. In addition, it is expected that the user can know new content according to his or her preference.

5. Modification of Second Embodiment of Present Invention

Next, a modification of the second embodiment of the present invention will be described. According to the modification of the second embodiment, it is determined whether the user is notified that there is correlated content according to the amount of content correlated with content decided to be reproduced.

Figure 23:
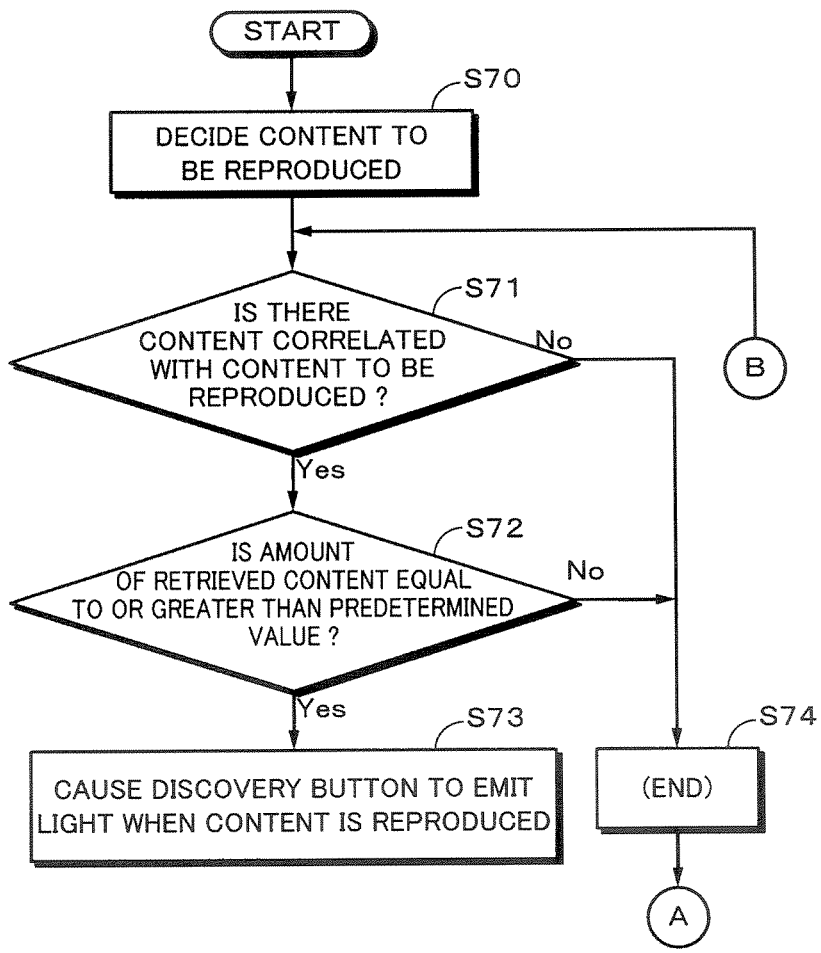
FIG. 23 is a flow chart showing an example of the operation of a correlated information notifying method according to a modification of the second embodiment of the present invention.

FIG. 23 is a flow chart showing an example of the operation of a correlated information notifying method according to a modification of the second embodiment of the present invention. In the flow chart shown in FIG. 23, letter "A" denotes an entrance to a flow chart shown in FIG. 24, whereas letter "B" denotes an entrance from the flow chart shown in FIG. 24.

When content to be reproduced has been decided in the reproducing apparatus 1 in a predetermined manner (at step S70), the flow advances to step S71. At step S71, with reference to a database that manages content recorded in the reproducing apparatus 1, it is determined whether content correlated with the content decided to be reproduced has been recorded in the reproducing apparatus 1. When the determined result denotes that correlated content has not been recorded in the reproducing apparatus 1, the flow advances to step S74. Thus, the user is not notified of correlated content.

For example, with reference to the database according to a content ID of the content decided to be reproduced, information about an artist strongly correlated with an artist of the content decided to be reproduced is retrieved. When the retrieved result denotes that information about an artist strongly correlated with the artist of the content decided to be reproduced has been registered in the database, it can be determined that content correlated with the content decided to be reproduced has been recorded in the reproducing apparatus 1.

When the determined result at step S71 denotes that content correlated with content decided to be reproduced has been recorded in the reproducing apparatus 1, the flow advances to step S72. At step S72, it is determined whether the amount of content retrieved at step S71 is equal to or greater than a predetermined value. When the determined result denotes that the amount of content retrieved is equal to or smaller than the predetermined value, the flow advances to step S74. As a result, the user is not notified of correlated content.

When the determined result at step S72 denotes that the amount of content retrieved at step S71 is equal to or greater than the predetermined value, the flow advances to step S73. At step S73, for example the lighting section 15 of the discovery button 14 emits light to notify the user that correlated content has been recorded in the reproducing apparatus 1. The illumination period and illumination timing of the lighting section 15 are the same as those of the example of the first embodiment.

Figure 24:
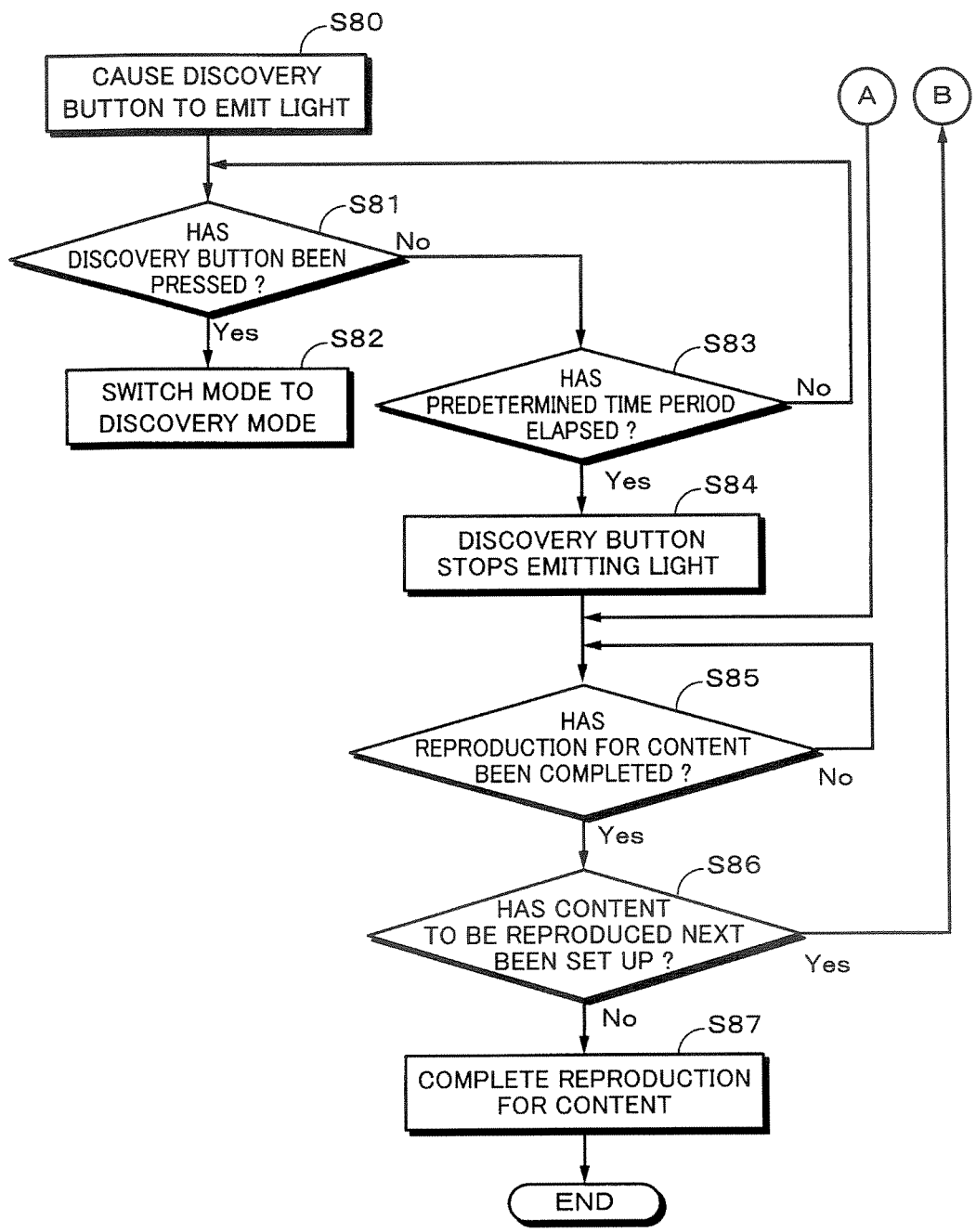
FIG. 24 is a flow chart showing an example of a process after the user has been notified of correlated content.

6. Operation after Notification of Correlated Content in Common with Second Embodiment and its Modification Next, an example of a process after notification of correlated content in common with the second embodiment and its modification will be described with reference to a flow chart shown in FIG. 24. In FIG. 24, letter "A" denotes an entrance to the flow chart shown in FIG. 21 or FIG. 23, whereas letter "B" denotes an entrance from the flow chart shown in FIG. 21 or FIG. 23.

In the flow chart shown in FIG. 24, at step S80, the lighting section 15 of the discovery button 14 emits light. In other words, the process at step S80 corresponds to the process at step S64 of the flow chart, shown in FIG. 21, according to the second embodiment or the process at step S73 of the flow chart, shown in FIG. 23, according to the modification of the second embodiment.

At step S81, the user is prompted to press the discovery button 14. The reproducing apparatus 1 waits until a predetermined time period has elapsed (at step S83). When the discovery button 14 is pressed in the predetermined time period after the lighting section 15 of the discovery button 14 emits light at step S80, the flow advances to step S82. At step S82, the operation of the reproducing apparatus 1 is switched to the artist link mode.

In contrast, unless the user does not press the discovery button 14 in the predetermined time period after the lighting section 15 emits light, the flow advances to step S84. At step S84, the lighting section 15 of the discovery button 14 stops emitting light. Thereafter, the flow advances to step S85. At step S85, the reproducing apparatus 1 waits until the reproduction for content has been completed. In other words, when the process shown in FIG. 21 is switched to the process shown in FIG. 24, the reproducing apparatus 1 waits until the reproduction for the content decided to be reproduced at step S60 has been completed. When the process shown in FIG. 23 is switched to the process shown in FIG. 24, the reproducing apparatus 1 waits until the reproduction for the content decided to be reproduced at step S70 has been completed.

When the determined result at step S85 denotes that the reproduction for the content has been completed, the flow advances to step S86. At step S86, it is determined whether content to be reproduced next has been set up. When the determined result denotes that content to be reproduced next has not been set up, the flow advances to step S87. At step S87, the reproduction for content is completed.

In contrast, when the determined result at step S86 denotes that content to be reproduced next has been set up, the flow advances to the process designated by letter "B". In other words, when the process shown in FIG. 21 is switched to the process shown in FIG. 24, the flow advances from step S86 to step S61 shown in FIG. 21. At step S61, it is determined whether the evaluation value of content to be reproduced next exceeds a predetermined value. When the process shown in FIG. 23 is switched to the process shown in FIG. 24, the flow advances from step S86 to step S71 shown in FIG. 23. At step S71, it is determined whether there is another content correlated with the content to be reproduced.

After step S65 shown in FIG. 21, the flow advances to step S85 shown in FIG. 24. At step S85, the reproducing apparatus 1 waits until the reproduction for the content decided to be reproduced at step S60 shown in FIG. 21 has been completed. Likewise, after step S74 shown in FIG. 23, the flow advances to step S85 shown in FIG. 24. At step S85, the reproducing apparatus 1 waits until the reproduction for the content decided to be reproduced at step S70 shown in FIG. 23 has been completed. Thereafter, the flow advances to step S86. At step S86, it is determined whether there is content to be reproduced next.

The process of the flow chart shown in FIG. 24 may be applied to the process of the flow chart shown in FIG. 20 according to the first embodiment. In this case, after step S53 shown in FIG. 20, the flow advances to step S85 shown in FIG. 24. When the determined result at step S86 shown in FIG. 24 denotes that there is content to be reproduced next, the flow advances to step S51.

7. Example of Retrieval for Correlated Content According to Attribute Other than Artist According to the first embodiment, the second embodiment, and the modification of the second embodiment, it is determined whether artists strongly correlated with an artist of content decided to be reproduced have been recorded in the reproducing apparatus 1 (at step S51 shown in FIG. 20, step S62 shown in FIG. 21, and step S71 shown in FIG. 23). However, these embodiments and modification may not be limited to such examples. In other words, the determination may be performed according to an attribute other than artists for the content decided to be reproduced.

In the example of the attribute information table shown in FIG. 5, it is thought that the determination is performed according to a genre of content. For example, artists are retrieved in the conditions that the genre of content of the artists matches the genre of the content decided to be reproduced and that the amount of content of the artists recorded in the reproducing apparatus 1 exceeds a predetermined value. At this point, it is preferred that the foregoing small genres be used as a retrieval condition.

At step S51 shown in FIG. 20, step S62 shown in FIG. 21, and step S71 shown in FIG. 23, a feature of the content decided to be reproduced may be extracted. Correlated content may be retrieved according to the extracted feature. When content is music data reproduced as music, it may be thought that the music data are analyzed and then tempo, melody, tune, and so forth are extracted as characteristic data of the content from the music data.

As an example of analysis of music data, when the music data are a composition according to a particular beat such as rock music or pop music, a common part of left and right stereo audio signals can be determined as a beat and/or a melody (vocal). The amplitude, frequency components, and so forth of the common part of the left and right stereo audio signals are analyzed. A part that varies at intervals of a predetermined time period is extracted as a tempo. When a pattern that is intrinsic to a human voice is detected, a melody part can be extracted. When the pitch of the melody part is obtained, a key (minor key, major key, etc.) of the music can be detected.

Music data are analyzed, for example, by the PC 2. The analyzed result of each content item is described in the attribute information table and transferred to the reproducing apparatus 1. Instead, content data recorded in the hard disk drive 32 of the reproducing apparatus 1 may be analyzed. Instead, the music server 4 side may provide information such as tempo, melody, and tune for each content item. These information provided on the music server 4 side is transferred to the PC 2 when the PC 2 is connected to the music server 4. These information is transferred from the PC 2 to the reproducing apparatus 1 when the reproducing apparatus 1 is connected to the PC 2.

It may be thought that at step S62, correlated content may be retrieved according to statistic information of content decided to be reproduced. It is thought that the statistic information of content is information of which artists and content are probabilistically obtained such as "a person who likes artist A tends to like artist B" and "a person who likes content C tends to like content D".

The music server 4 side pre-obtains such statistic information for each artist and each content item according to content download requests from the user side. When the PC 2 is connected to the music server 4, it transfers statistic information as information of an attribute information table of content to the PC 2. Statistic information for each artist and for each content item transferred to the PC 2 is transferred to the reproducing apparatus 1 when the reproducing apparatus 1 is connected to the PC 2.

8. Modification Other than First Embodiment, Second Embodiment, and Modification of Second Embodiment At step S64 shown in FIG. 21 according to the first embodiment, step S64 shown in FIG. 21 according to the second embodiment, and at step S73 shown in FIG. 22 according to the modification of the second embodiment, the lighting section 15 of the discovery button 14 emits light, notifying the user of correlated content of content decided to be reproduced. Instead, the user may be notified of correlated content with audio sound or vibration. Instead, the user may be notified of correlated content with an indication on the display section 10.

When the user is notified of correlated content with audio sound, it is thought that the audio sound is pre-recorded, for example, as a predetermined audio file in the hard disk drive 32. When the user is notified of correlated content, the audio file is read from the hard disk drive 32 and the audio file is reproduced in the same manner as audio data of content. The audio file is output from the HP amplifier 45 to the remote control terminal 47. The head set reproduces the audio file as audio sound.

Instead, the audio sound may be generated by the microcomputer 41 according to a program in a predetermined manner. The microcomputer 41 generates audio data according to a program in a predetermined manner. The audio data are converted into an analog audio signal by the DAC 44. The HP amplifier 45 outputs the audio signal to the remote control terminal 47.

When the method of notifying the user of correlated content with audio sound is applied to the second embodiment, it is thought that a plurality of sound patterns used to notify the user of correlated content are prepared and one of them is selected according to the evaluation value.

When the user is notified of correlated content with audio sound, it is preferred that the audio sound be output after the completion of the reproduction of content to prevent the audio sound from affecting the reproduction of the content.

When the user is notified of correlated content with vibration, a vibrator is disposed in the reproducing apparatus 1. The operation of the vibrator is controlled by the microcomputer 41. When the method of notifying the user of correlated content with vibration is applied to the second embodiment, it may be thought that vibration patterns may be changed according to the evaluation value. When the user is notified of correlated content with vibration, the timing at which the vibrator vibrates may be the same as that at which the lighting section 15 emits light.

When the user is notified of correlated content with audio sound or vibration, he or she can know that there is correlated content without necessity of seeing the reproducing apparatus 1. In particular, when the user is notified of correlated content with audio sound, while he or she is listening to music reproduced from the reproducing apparatus 1 that he or she has, for example, in a bag or a pocket of his or her clothing, he or she can know that there is content correlated with content that is being reproduced.

Instead, the user may be notified of correlated content with an indication on the display section 10. The microcomputer 41 generates a display control signal according to a program to display an indication with which the user is notified of correlated content and supplies the generated display control signal to the display controlling section 35. The display controlling section 35 generates a display signal according to the display control signal and supplies the display signal to the display section 10. The indication with which the user is notified of correlated content may be predetermined text, icon, image, or the like.

In the foregoing description, an example of which the discovery button 14 and the lighting section 15 are disposed in the reproducing apparatus 1 was described. Instead, the discovery button 14 and the lighting section 15 may be disposed in the remote control commander connected to the remote control terminal 47. At this point, a control signal according to an operation of the discovery button 14 is supplied from the remote control commander to the remote control terminal 47 and then supplied to the microcomputer 41 through the system gate array 36 and the bus 40. A control signal with which the lighting section 15 is controlled is output from the microcomputer 41 and then supplied to the remote control terminal 47 through the bus 40 and the system gate array 36. Thereafter, the control signal is supplied to the remote control commander.

Figure 25:
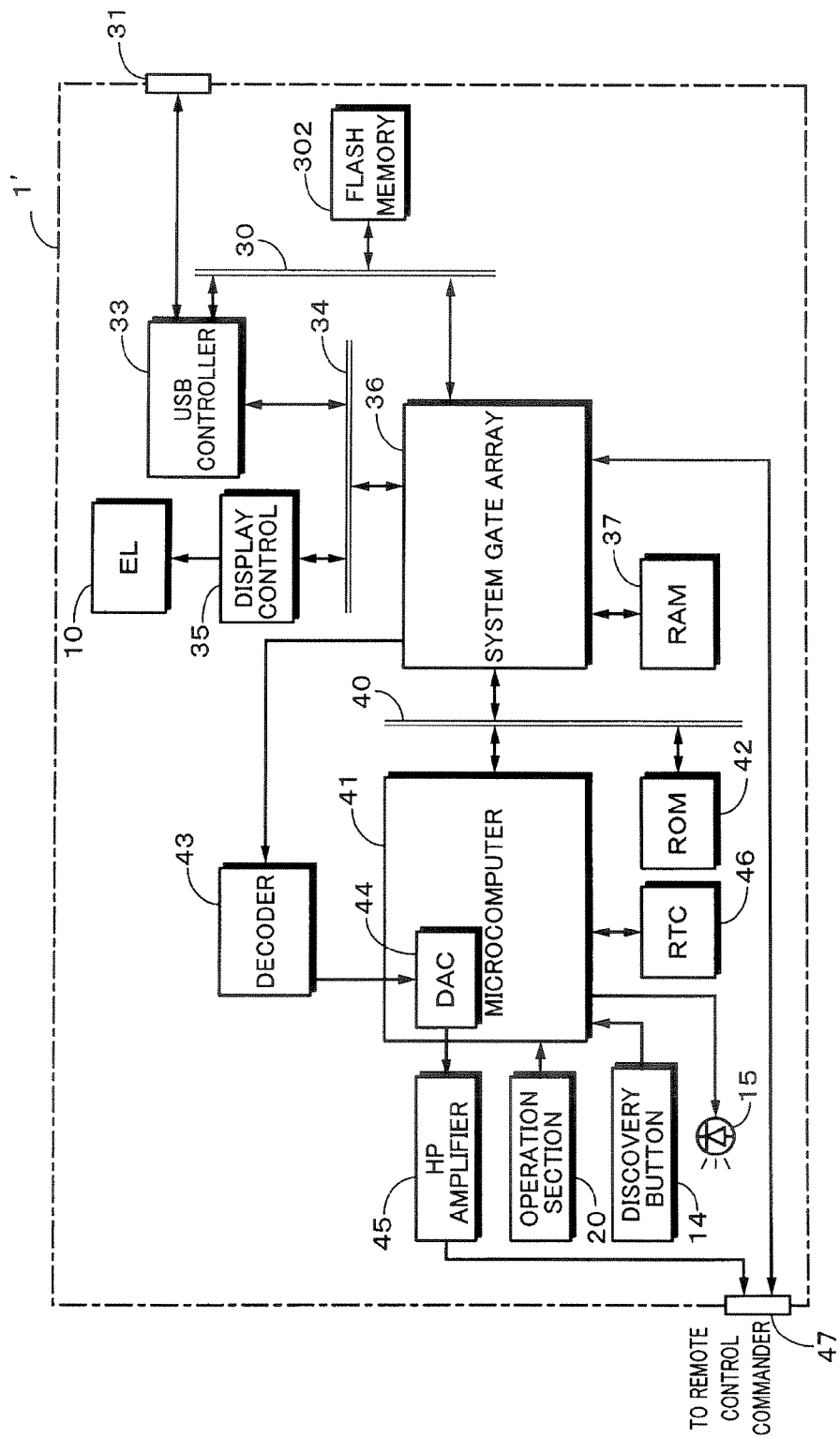
FIG. 25 is a block diagram showing an example of the structure of a reproducing apparatus using a rewritable ROM as a record medium.

In the foregoing example, the record medium that records content is the hard disk drive 32 of the reproducing apparatus 1. Instead, as exemplified in FIG. 25, the embodiments and modification of the present invention may be applied to a reproducing apparatus 1' that uses a rewritable non-volatile semiconductor memory such as a flash memory 302.

In the foregoing examples, content was described as audio data such as music data. Instead, content may be moving picture data, still picture data, and/or text data.

9. Correlated Information Notifying Method According to Third Embodiment of Present Invention Next, a third embodiment of the present invention will be described. According to the third embodiment of the present invention, the reproducing apparatus 1 is provided with a wireless communication function. With the wireless communication function, the reproducing apparatus 1 directly transmits and receives data to and from the music server 4 and another terminal unit not through the PC 2.

Figure 26:
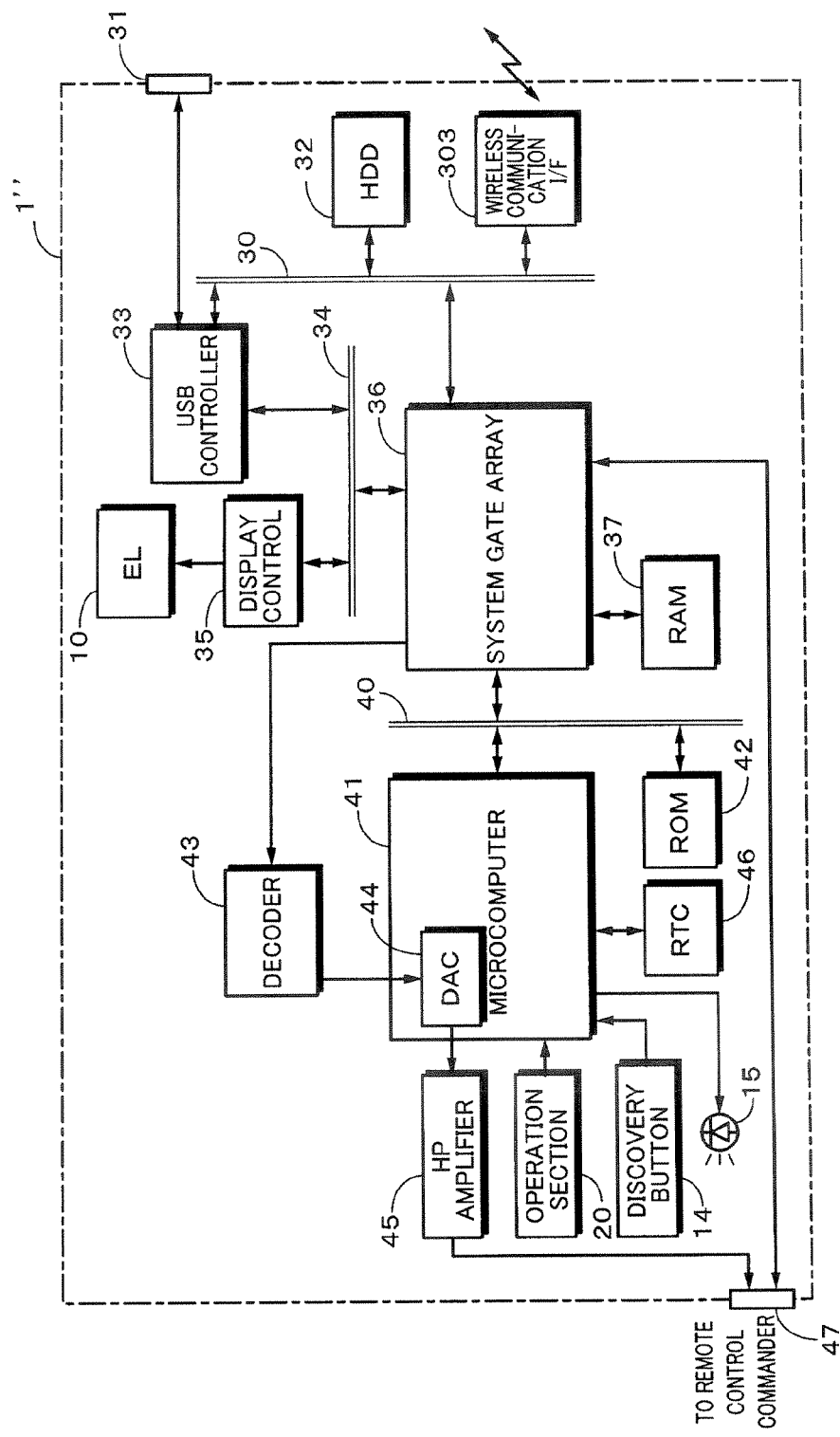
FIG. 26 is a block diagram showing an example of the structure of a reproducing apparatus using a wireless communication interface that controls wireless communications.

FIG. 26 shows an example of the structure of a reproducing apparatus 1" that is the same as the reproducing apparatus 1 except that the reproducing apparatus 1" includes a wireless communication interface 303 that controls wireless communications. In FIG. 26, similar portions to those in FIG. 3 are denoted by similar reference numerals and their detailed description will be omitted. The wireless communication interface 303 is connected to a bus 30. The wireless communication interface 303 exchanges data and commands with a microcomputer 41 through the bus 30, a system gate array 36 and a bus 40. The wireless communication interface 303 wirelessly communicates with the outside by transmitting and receiving data and commands to and from the outside using radio waves according to a predetermined protocol under the control of the microcomputer 41. Instead, the wireless communication interface 303 may wirelessly communicate with the outside using infrared signals.

Figure 27:
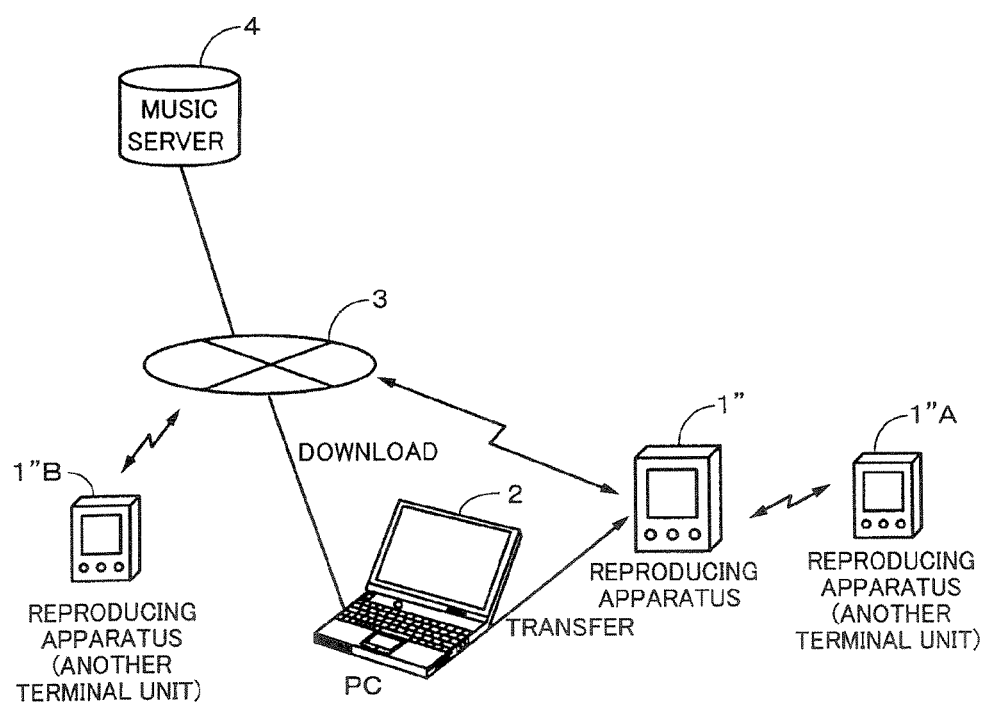
FIG. 27 is a schematic diagram showing an example of a configuration of which a reproducing apparatus according to a third embodiment of the present invention is used.

When the reproducing apparatus 1" is provided with the wireless communication interface 303 that has the wireless communication function, the reproducing apparatus 1" can directly transmit and receive data to and from another reproducing apparatus having the same function as the reproducing apparatus 1" and the music server 4 not through the PC 2. As shown in FIG. 27, the reproducing apparatus 1" wirelessly communicates with a wireless communication facility (not shown) disposed over the Internet 3 using the wireless communication interface 303 and directly transmits and receives data to and from the music server 4 through the Internet 3.

In addition, the reproducing apparatus 1" can wirelessly communicate with another terminal unit having the same function as the reproducing apparatus 1" to transmit and receive data and commands to and from the terminal unit. As exemplified in FIG. 27, the reproducing apparatus 1" can directly transmit and receive data and commands to and from a reproducing apparatus 1"A that is disposed around the reproducing apparatus 1", that has the same function as the reproducing apparatus 1", and that can store content data. When the distance between the reproducing apparatus 1" and the reproducing apparatus 1"A is small and they can be seen directly from each other, data and commands can be transmitted and received to and from each other with infrared signals as well as radio waves.

In addition, the reproducing apparatus 1" can communicate with a reproducing apparatus 1"B that has the same function as the reproducing apparatus 1" and can store content data through the Internet 3 so as to transmit and receive data and commands to and from the reproducing apparatus 1"B. In this case, the reproducing apparatus 1" and the reproducing apparatus 1"B are connected to the Internet 3 through wireless communication facilities (not shown) over the Internet 3 and communicate with each other.

While the reproducing apparatus 1" is reproducing content data, the reproducing apparatus 1" communicates with other terminal units such as the reproducing apparatus 1"A and the reproducing apparatus 1"B. When these terminal units have content data correlated with content data that the reproducing apparatus 1" is reproducing, a lighting section 15 of a discovery button 14 of the reproducing apparatus 1" can emit light.

Figure 28:
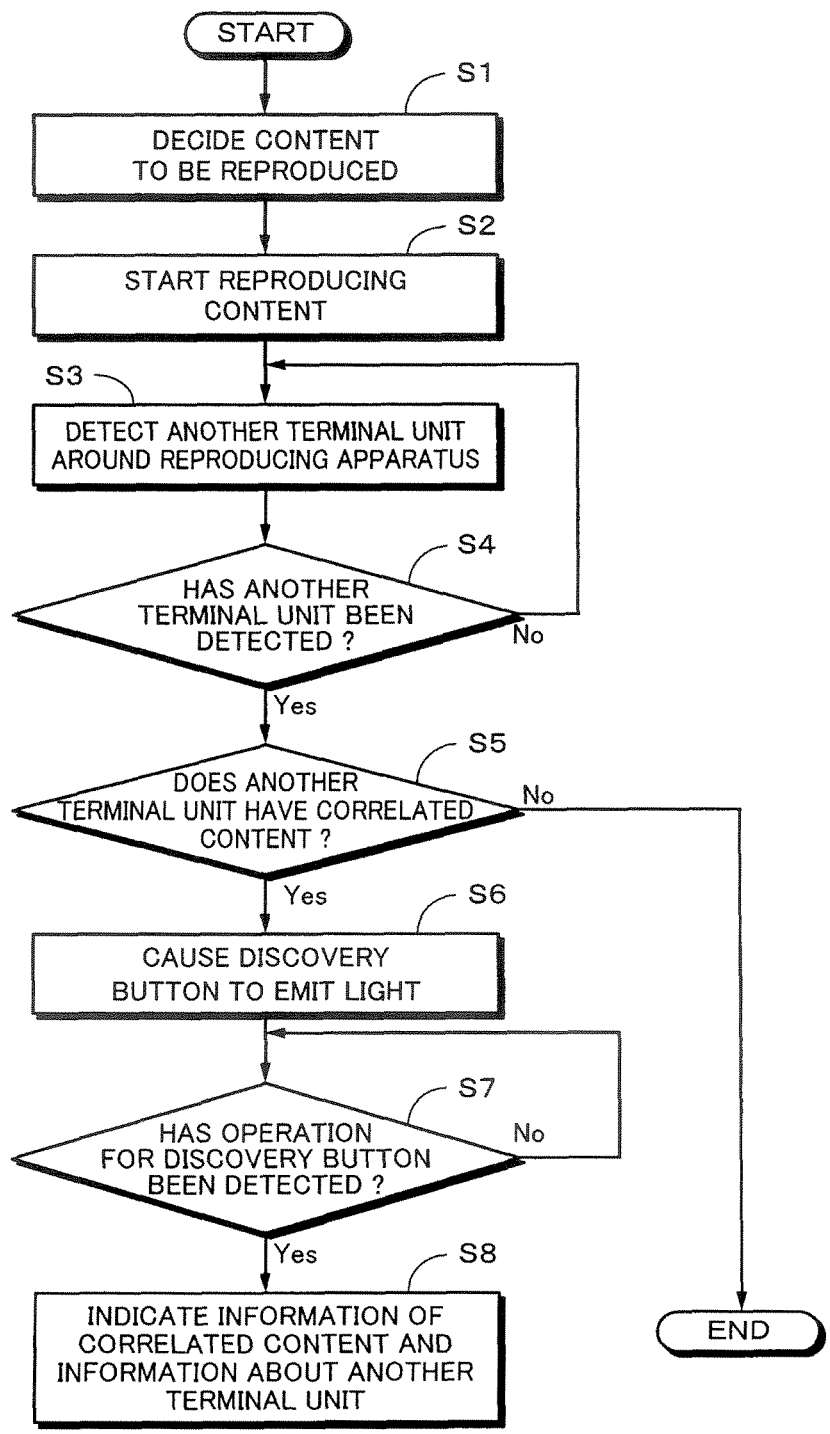
FIG. 28 is a flow chart showing an example of a process of turning on a discovery button when there are correlated content data in another terminal unit.

FIG. 28 is a flow chart showing an example of a process of causing the lighting section 15 of the discovery button 14 to emit light when there is correlated content data in another terminal unit. In the reproducing apparatus 1", content data to be reproduced is selected and decided as described above under the control of the microcomputer 41 according to a user's operation for the operation section 20 (at step S1). Thereafter, the content data are reproduced at step S2.

After the reproduction for content data is started, the flow advances to step S3. At step S3, in the reproducing apparatus 1", the wireless communication interface 303 communicates in a predetermined manner under the control of the microcomputer 41. The reproducing apparatus 1 and the wireless communication interface 303 detect another communicable terminal unit. At this point, the reproducing apparatus 1" may detect another terminal, for example, the reproducing apparatus 1"A, as shown in FIG. 28, disposed around the reproducing apparatus 1". Instead, the reproducing apparatus 1" may detect another terminal unit, for example, the reproducing apparatus 1"B, as shown in FIG. 28, communicable through the Internet 3.

At step S4, it is determined whether the reproducing apparatus 1" and the wireless communication interface 303 have detected another terminal unit. When the determined result at step S4 denotes that another communicable terminal unit has been detected, the flow advances to step S5. At step S5, it is determined whether the other terminal has content data correlated with content data that the reproducing apparatus 1" is currently reproducing.

For example, the reproducing apparatus 1" transmits a content ID of content data that the reproducing apparatus 1" is currently reproducing and a retrieval request for content data correlated with content data having the content ID to the detected terminal unit. The detected terminal unit retrieves content data from the content data storing section according to the content ID and the retrieval request transmitted from the reproducing apparatus 1" and sends the retrieved result back to the reproducing apparatus 1" using the wireless communication function.

The method of determining whether the other terminal has content data correlated with content data that the reproducing apparatus 1" is reproducing is not limited to such an example. Instead, it may be thought that the reproducing apparatus 1" requests another terminal unit for a list of content data stored in the content data storing section and determines whether there is correlated content data according to the list.

When the determined result at step S4 denotes that another communicable terminal unit has not been detected in a predetermined time period, the process may be terminated as a timeout. Thereafter, the reproducing apparatus 1" continues to reproduce content data.

When the determined result at step S5 denotes that the other terminal does not have content data correlated with content data that the reproducing apparatus 1" is currently reproducing, the process is completed. Thereafter, the reproducing apparatus 1" continues to reproduce content data.

In contrast, when the determined result at step S5 denotes that the other terminal has content data correlated with content data that the reproducing apparatus 1" is currently reproducing, the flow advances to step S6. At step S6, for example the lighting section 15 of the discovery button 14 emits light under the control of the microcomputer 41 so as to notify the user of the correlated content data.

While the lighting section 15 of the discovery button 14 of the reproducing apparatus 1' is emitting light, when the user's operation for the discovery button 14 is detected (at step S7), the flow advances to step S8. At step S8, attribute information of content data correlated with content data that the reproducing apparatus 1" is currently reproducing and information about the other terminal are displayed on the display section 10 under the control of the microcomputer 41.

Examples of the attribute information of correlated content data include title of content data, album name, artist name, and genre name. The attribute information of the correlated content data can be obtained, for example, from the other terminal through wireless communications according to the content ID of the content data. Instead, the wireless communication interface 303 may communicate with the music server 4 through the Internet 3 to obtain the attribute information according to the content ID.

Information about the other terminal unit may be information with which it can be identified. For example, when the reproducing apparatus 1" communicates with the other terminal unit according to a communication protocol for example Transmission Control Protocol/Internet Protocol (TCP/IP), an Internet protocol (IP) address of the other terminal unit may be used as information about the other terminal unit. Instead, as information about the other terminal unit, its terminal name may be used. The terminal name is stored, for example, in a ROM of the other terminal unit or a storage section that stores the content data. In the example of the reproducing apparatus 1" shown in FIG. 26, the terminal name may be pre-stored as system information in the ROM 42. Instead, a terminal name that the user can set up may be stored in the hard disk drive 32.

In the foregoing example, the case of which the reproducing apparatus 1" communicates with the reproducing apparatus 1"A and the reproducing apparatus 1"B with the wireless communication interface 303 was described. Instead, in the reproducing apparatus 1", the wireless communication interface 303 may wirelessly communicate with the music server 4 through the Internet 3 so as to retrieve content data correlated with content data that are currently being reproduced from the music server 4.

Thus, according to the third embodiment, content data correlated with content data that are currently being reproduced may be retrieved from another terminal unit and the music server 4 as well as the local reproducing apparatus.

It should be understood by those skilled in the art that various modifications, combinations, sub-combinations and alternations may occur depending on design requirements and other factors insofar as they are within the scope of the appended claims or the equivalents thereof.

What is claimed is:

1. An information processing apparatus comprising:
    circuitry configured to:
        automatically search for information related to content data after reproduction of the content data has been started;
        automatically provide a notification when the information related to the content data is found while the content data is being reproduced, a pattern of the notification being determined based on evaluation information for the content data; and
        receive a request, based upon a notification-based-operation by a user, to provide the information related to the content data,
    wherein the information related to the content data indicates non-evaluated content.

2. The information processing apparatus according to claim 1, wherein when next content data is reproduced, the circuitry is configured to automatically search for information related to the next content data.

3. The information processing apparatus according to claim 1, wherein the information related to the content data is provided via the internet.

4. The information processing apparatus according to claim 1, wherein the content data includes at least one of text data, image data, audio data, and video data.

5. The information processing apparatus according to claim 1, wherein the circuitry is configured to provide the information related to the content data such that the content data and the information related to the content data are simultaneously viewable on a same screen.

6. The information processing apparatus according to claim 1, wherein the notification is separate from the information related to the content data.

7. The information processing apparatus according to claim 1, wherein the information related to the content data is provided based on the user request.

8. The information processing apparatus according to claim 1, wherein the circuitry is configured to clear the notification when the notification-based-operation by the user is not received within a predetermined time period.

9. An information processing apparatus comprising:
    circuitry configured to:
        reproduce content data;
        receive a notification automatically issued when information related to the content data is automatically searched for in response to starting the reproduction of the content data and found while the content data is being reproduced, a pattern of the notification being determined based on evaluation information for the content data;
        automatically display the notification;
        provide the information related to the content data in response to a notification-based-operation by a user,
    wherein the information related to the content data indicates non-evaluated content.

10. The information processing apparatus according to claim 9, wherein the circuitry is configured to provide both the content data and the information related to the content data on the same screen such that the content data and the information related to the content data are simultaneously viewable.

11. The information processing apparatus according to claim 10, wherein the notification is separate from the information related to the content data.

12. The information processing apparatus according to claim 9, wherein
the circuitry is configured to display an icon image, and
the information related to the content data is provided based upon an operation of the icon by the user.

13. The information processing apparatus according to claim 9, wherein the circuitry is configured to clear the notification when the notification-based-operation by the user is not received within a predetermined time period.

14. An information processing method comprising:
automatically searching, via circuitry of an information processing apparatus, for information related to content data after reproduction of the content data has been started;
automatically providing, via the circuitry, a notification when the information related to the content data is found while the content data is being reproduced, a pattern of the notification being determined based on evaluation information for the content data; and
receiving, via the circuitry, a request, based upon a notification-based-operation by a user, to provide the information related to the content data,
wherein the information related to the content data indicates non-evaluated content.

15. The information processing method according to claim 14, further comprising automatically searching for information related to next content data when next content data is reproduced.

16. The information processing method according to claim 14, further comprising providing the information related to the content data via the internet.

17. The information processing method according to claim 14, wherein the content data includes at least one of text data, image data, audio data, and video data.

18. The information processing method according to claim 14, further comprising providing the information related to the content data such that the content data and the information related to the content data are simultaneously viewable on a same screen.

19. The information processing method according to claim 14, wherein the notification is separate from the information related to the content data.

20. The information processing method according to claim 14, further comprising providing the information based on the user request.

21. A non-transitory computer readable medium storing instructions which when executed by a computer cause the computer to perform the method of claim 14.

22. The information processing method according to claim 14, further comprising clearing the notification when the notification-based-operation by the user is not received within a predetermined time period.

23. An information processing method comprising:
reproducing, via circuitry of an information processing apparatus, content data;
receiving, via the circuitry, a notification automatically issued when information related to the content data is automatically searched for in response to starting the reproduction of the content data and found while the content data is being reproduced, a pattern of the notification being determined based on evaluation information for the content data;
automatically displaying, via the circuitry, the notification;
providing, via the circuitry, the information related to the content data in response to a notification-based-operation by a user,
wherein the information related to the content data indicates non-evaluated content.

24. The information processing method according to claim 23, further comprising providing both the content data and the information related to the content data on the same screen such that the content data and the information related to the content data are simultaneously viewable.

25. The information processing method according to claim 24, wherein the notification is separate from the information related to the content data.

26. The information processing method according to claim 23, further comprising:
displaying an icon image, and
providing the information related to the content data based upon an operation of the icon by the user.

27. A non-transitory computer readable medium storing instructions which when executed by a computer cause the computer to perform the method of claim 23.

28. The information processing method according to claim 23, further comprising clearing the notification when the notification-based-operation by the user is not received within a predetermined time period.

* * * * *